United States Patent [19]
Ujiie et al.

[11] Patent Number: 5,164,574
[45] Date of Patent: Nov. 17, 1992

[54] APPARATUS FOR READING BAR CODES RECORDED ON PHOTOGRAPHIC FILM

[75] Inventors: Yoichi Ujiie; Syuji Tahara, Kanji Takuda; Yoshihiko Saeki, all of Kanagawa, Japan

[73] Assignee: Fuji Photo Film Co., Ltd., Kanagawa, Japan

[21] Appl. No.: 315,863

[22] Filed: Feb. 27, 1989

[30] Foreign Application Priority Data

| Feb. 27, 1988 | [JP] | Japan | 63-45563 |
| Mar. 18, 1988 | [JP] | Japan | 63-65339 |
| Aug. 8, 1988 | [JP] | Japan | 63-197762 |

[51] Int. Cl.⁵ .................. G06K 7/10; G03B 27/32; G03B 23/12
[52] U.S. Cl. ..................... 235/462; 235/375; 235/466; 235/475; 355/41; 355/77; 353/26 A
[58] Field of Search ............... 235/375, 376, 454, 469, 235/475, 476, 440, 456, 462; 250/571, 566, 568, 570; 353/26 R, 26 A, 27 R, 27 A; 352/92, 236; 355/38, 40, 41

[56] References Cited

U.S. PATENT DOCUMENTS

| 4,207,473 | 6/1980 | Nakatani et al. | 250/570 |
| 4,369,372 | 1/1983 | Yoshioka et al. | 250/208.1 |
| 4,514,641 | 4/1985 | Tanaka et al. | 250/570 |
| 4,553,833 | 11/1985 | Kanaoka et al. | 352/92 |
| 4,555,632 | 11/1985 | Vockenhuber | 250/560 |
| 4,638,170 | 1/1987 | Kubota | 250/566 |
| 4,656,343 | 4/1987 | Gerritsen et al. | 235/454 |
| 4,659,213 | 4/1987 | Matsumoto | 355/38 |
| 4,691,112 | 9/1987 | Wydler | 250/570 |
| 4,707,120 | 11/1987 | Yamamoto | 355/38 |
| 4,727,399 | 2/1988 | Matsumoto | 250/571 |
| 4,792,670 | 12/1988 | Fukana et al. | 250/211 R |
| 4,797,713 | 1/1989 | Terashita et al. | 355/38 |
| 4,806,990 | 2/1989 | Tahara | 355/75 |
| 4,825,387 | 4/1989 | Ono | 355/40 |
| 4,906,854 | 3/1990 | Rauh et al. | 250/570 |
| 4,914,471 | 4/1990 | Saeki et al. | 355/41 |
| 4,918,484 | 4/1990 | Ujiie et al. | 355/77 |
| 4,965,628 | 10/1990 | Olliver et al. | 355/41 |

FOREIGN PATENT DOCUMENTS

| 2162566 | 5/1973 | Fed. Rep. of Germany . |
| 2614965 | 10/1977 | Fed. Rep. of Germany ........ 355/41 |

Primary Examiner—Stuart S. Levy
Assistant Examiner—Edward H. Sikorski
Attorney, Agent, or Firm—Sughrue Mion Zinn Macpeak & Seas

[57] ABSTRACT

Two bar code sensors are disposed at opposite sides of a passage of a photographic film, each bar code sensor having first and second photosensor arrays. The first and second photosensor arrays are located at the passages of the clock track and the data track, respectively, along a line perpendicular to the transportation direction of the photographic film. The DX bar code data and frame number bar code data are discriminated automatically based on the bar code data configuration read out with the bar code sensor units. The setting condition of the photographic film is detected, also based on the bar code data configuration. In case of an abnormal state of the setting conditions, an alarm display is output. The bar code data is written in a memory when the data change, or synchronously with reading the clock track of the DX bar code. The number of a frame set at the film mask is calculated by measuring the feed amount of the read-out frame number bar code.

10 Claims, 19 Drawing Sheets

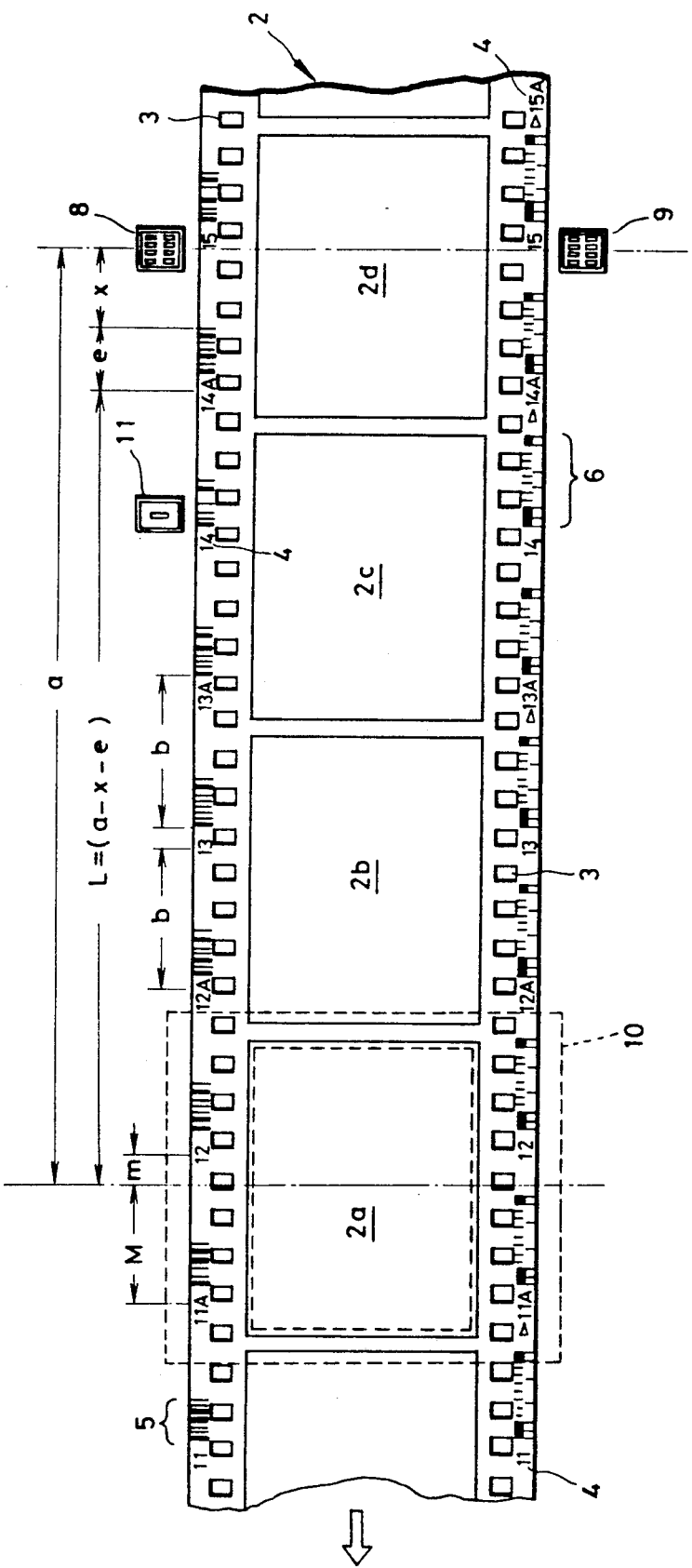

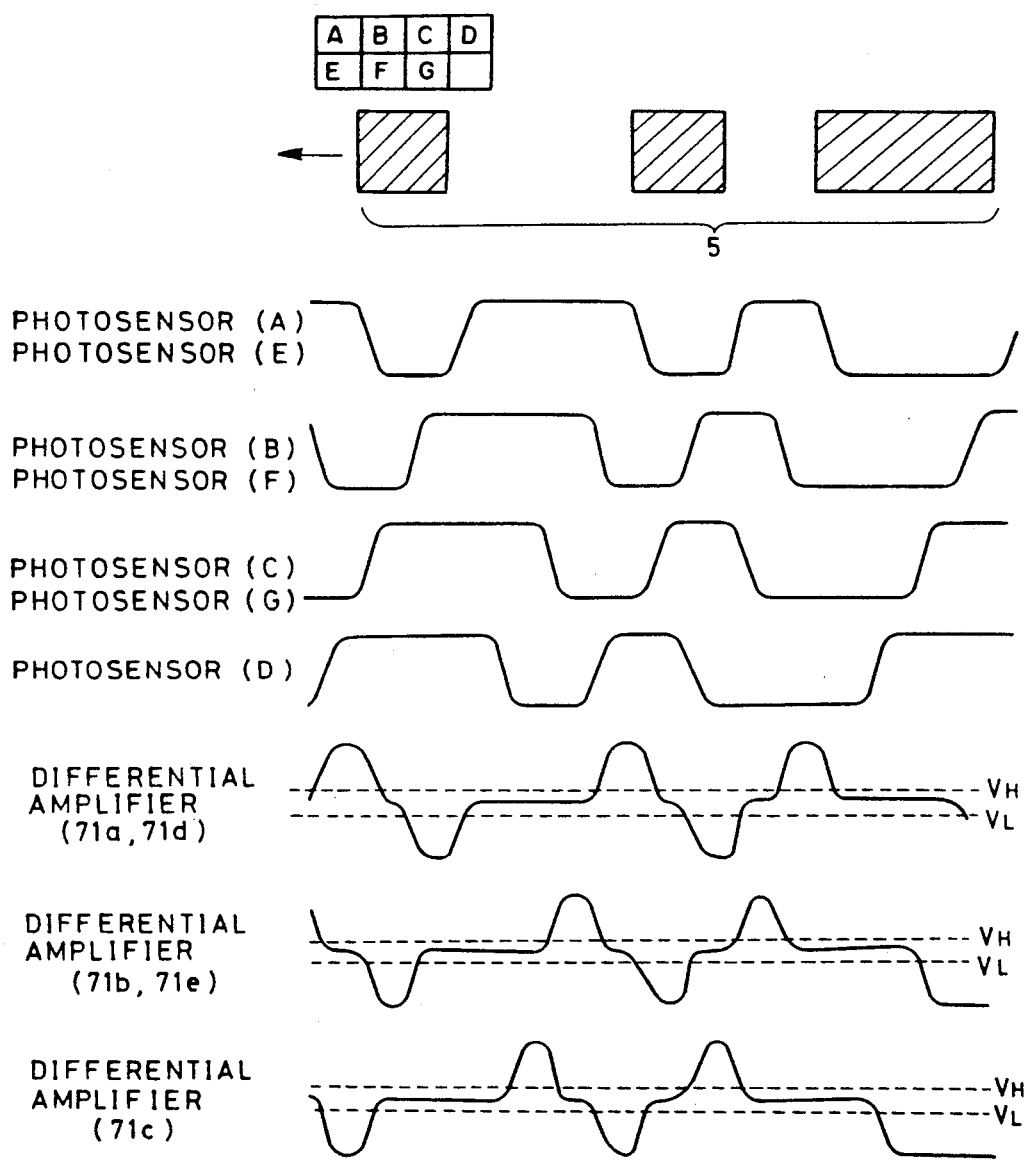

FIG. 11A
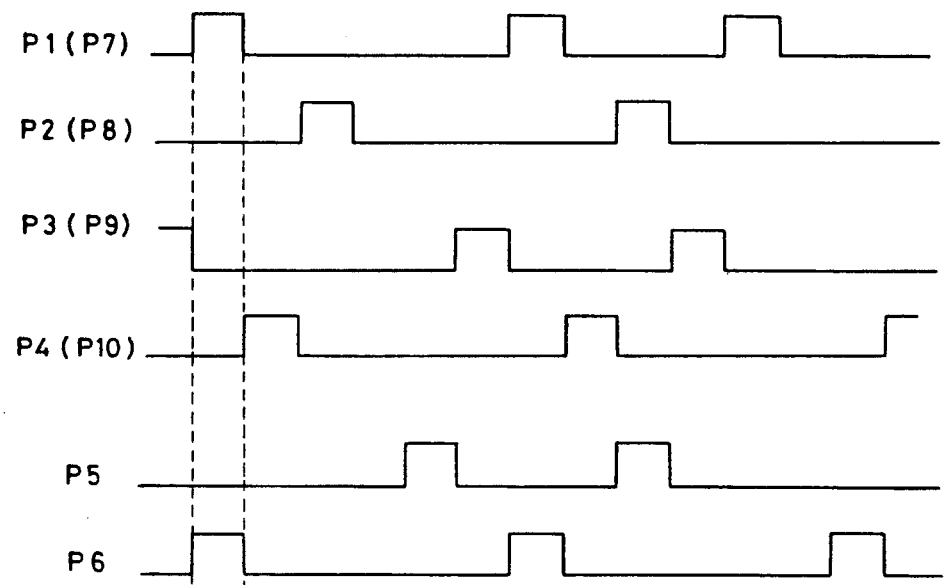
FIG. 11B
| | | | | | | | | | | | | | | | | | | | | | | | | | | | |
|---|---|---|---|---|---|---|---|---|---|---|---|---|---|---|---|---|---|---|---|---|---|---|---|---|---|---|---|
| P1 | 0 | 1 | 1 | 0 | 0 | 0 | 0 | 0 | 0 | 0 | 0 | 0 | 1 | 1 | 0 | 0 | 0 | 0 | 0 | 1 | 1 | 0 | 0 | 0 | 0 | 0 |
| P2 | 0 | 0 | 0 | 0 | 0 | 1 | 1 | 0 | 0 | 0 | 0 | 0 | 0 | 0 | 0 | 1 | 1 | 0 | 0 | 0 | 0 | 0 | 0 | 0 | 0 | 0 |
| P3 | 1 | 0 | 0 | 0 | 0 | 0 | 0 | 0 | 0 | 0 | 1 | 1 | 0 | 0 | 0 | 0 | 0 | 0 | 1 | 1 | 0 | 0 | 0 | 0 | 0 | 0 |
| P4 | 0 | 0 | 0 | 1 | 1 | 0 | 0 | 0 | 0 | 0 | 0 | 0 | 0 | 1 | 1 | 0 | 0 | 0 | 0 | 0 | 0 | 0 | 0 | 0 | 0 | 1 |
| P5 | 0 | 0 | 0 | 0 | 0 | 0 | 0 | 1 | 1 | 0 | 0 | 0 | 0 | 0 | 1 | 1 | 0 | 0 | 0 | 0 | 0 | 0 | 0 | 0 | 0 | 0 |
| P6 | 0 | 1 | 1 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| P7 | 0 | 1 | 1 | 0 | 0 | 0 | 0 | 0 | 0 | 0 | 0 | 1 | 1 | 0 | 0 | 0 | 0 | 0 | 1 | 1 | 0 | 0 | 0 | 0 | 0 | 0 |
| P8 | 0 | 0 | 0 | 0 | 1 | 1 | 0 | 0 | 0 | 0 | 0 | 0 | 0 | 0 | 1 | 1 | 0 | 0 | 0 | 0 | 0 | 0 | 0 | 0 | 0 | 0 |
| P9 | 1 | 0 | 0 | 0 | 0 | 0 | 0 | 0 | 0 | 1 | 1 | 0 | 0 | 0 | 0 | 0 | 1 | 1 | 0 | 0 | 0 | 0 | 0 | 0 | 0 | 0 |
| P10 | 0 | 0 | 0 | 1 | 1 | 0 | 0 | 0 | 0 | 0 | 0 | 0 | 0 | 1 | 1 | 0 | 0 | 0 | 0 | 0 | 0 | 0 | 0 | 0 | 0 | 1 |
FIG. 11C
STATES OF PHOTOSENSORS A B C D
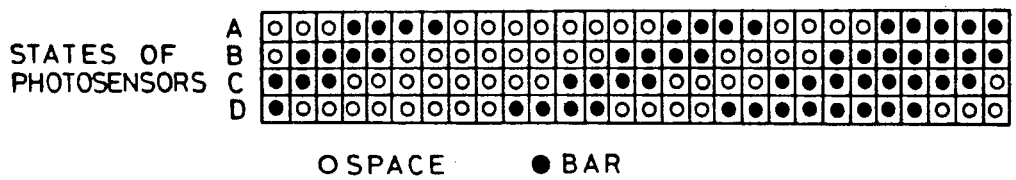
○ SPACE  ● BAR

APPARATUS FOR READING BAR CODES RECORDED ON PHOTOGRAPHIC FILM

BACKGROUND OF THE INVENTION

The present invention relates to an apparatus for reading DX bar codes and frame number bar codes which are printed along edges of photographic film.

DX bar codes representative of a film type (maker and film sensitivity) are printed in the form of a latent image on a side portion of a negative (e.g. 135 type) film, the DX bar codes being made visible upon development of the film. The DX bar code is constructed of a clock track used for reading timings, and a data track on which data are recorded, both tracks being printed in juxtaposed arrangement on the negative film. The DX bar code read with a bar code is sensor unit at the time of printing or at the time of inspecting the quality (color balance and density) of the frame image. The read-out film type data are used in calculating the exposure amount for printing.

It is also known to print a frame number bar code representative of a frame number along the lengthwise edge of a photographic film. The frame number bar code is used, e.g., for searching for a desired frame to obtain additional prints thereof and automatically setting that frame at the print stage of a printer, for recording a frame number on some area of the print to dispense with the comparison work between a print and the frame, and for other reasons known to those of ordinary skill in this field.

Printing both DX bar codes and frame number bar codes along the lengthwise edge of a photographic film requires the use of different types of bar codes to allow discrimination therebetween. Moreover it becomes necessary to use two bar code sensor units, dedicated to each of the two types of bar codes, and mounted on a film carrier at both the sides of a film passage. However, it becomes necessary to set the film on the film carrier in a predetermined direction with either the smallest frame number or the largest frame number at the start position. If a film is set in the wrong direction, neither the DX bar codes nor the frame number bar codes can be read correctly. Also, if a film is set upside down at the film carrier, the bar codes cannot be read correctly and a photograph printed from the rear side is produced, thus resulting in loss of material and work time.

A photographic film is liable to vibrations in the film feeding direction due to backlash in a film feeding mechanism, resulting in double reading of the same bar or space of a bar code. Apart from the above, even if a read error occurs for a DX bar code, the following same DX bar code printed at equal intervals on film may be read thus posing no problem. However, only one frame number bar code is present for each particular frame, so that if the bar code sensor unit erroneously reads the frame number, the erroneously read frame number, when set at the print stage, cannot be identified.

SUMMARY OF THE INVENTION

It is a principal object of the present invention to provide a bar code reading apparatus capable of reading both DX bar codes and frame number bar codes, irrespective of the direction in which a photographic film is set at the film carrier.

It is another object of the present invention to provide a bar code reading apparatus free from double reading the same bar or space of a bar code, even upon occurrence of vibration in a photographic film feeding mechanism.

It is a further object of the present invention to provide an apparatus for reading bar codes on photographic film, the apparatus being capable of identifying the number of a frame positioned at the print stage, even if a read error occurs, based on the read-out frame number bar code of the preceding frame.

It is a still further object of the present invention to provide a bar code reading apparatus capable of determining the setting conditions of a photographic film based on the position and direction of a read-out bar code.

It is a further object of the present invention to provide a bar code reading apparatus capable of readily reading a frame number bar code by using the clock track of a DX bar code.

The above and other objects, advantages of the present invention are achieved by the following, in which two bar code sensor units are disposed at both sides of a photographic film passage. Each of the bar code sensor units has two photosensor arrays, each array having a plurality of photosensors disposed in the direction of feeding a photographic film. Each photosensor array is disposed perpendicular to the photographic film feed direction. Irrespective of the film direction both DX bar codes and frame number bar codes are read with the two bar code sensor units.

Two types of data read with each bar code sensor unit are automatically discriminated into DX bar codes and frame number bar codes, based on the data configuration. The discriminated DX bar code is decoded into a film type, whereas the frame number bar code is decoded into a frame number. The setting conditions (film direction and film side) of a photographic film at a film carrier can be determined based on the reading of the bar codes. Use of a clock track of a DX bar code makes it easy to read a frame number bar code.

Vibration of a photographic film can be detected by checking the light measuring states of respective photosensors of the photosensor array. If the photographic film is caused to move backward because of vibration, the already read data are neglected or cancelled out, or the data pickup is stopped until the photographic film is returned to the original position, to eliminate double reading. If the intensity of a light source changes (or possibly for other reasons as well), the amplitudes of signals outputted from the photosensors change, so that reliable binarization is not possible. To deal with this problem, two adjacent photosensors are connected to a differential amplifier to obtain difference signals between two photosensor output signals and the difference signals are supplied to a window comparator to obtain binary signals which are used for detection of a boundary between bars and spaces. In detecting the boundary the photosensor array for a DX bar code may be constructed of three photosensors. Three of nine code is used as a frame number bar code, for detecting "1" and "0" based on the widths of bars and of spaces between two bars. Assuming that a narrower bar or space is arranged to have the same width as that of the bar of a DX bar code, and a wider bar or space is arranged to have a width twice that of the narrower, then the photosensor array may be constructed of four photosensors. Using the four photosensors, a change of read-out binary signals is detected and the resultant data are taken in. Thus it is not necessary to take in all data each time a photographic film is fed by a predetermined distance, resulting in reliable data reading.

It is preferable that the bar code sensor unit is implemented using an amorphous sensor which requires no wire bonding, the unit being made in contact with the photographic film for carrying out contact light-transmission type reading. With such an arrangement, an optical system including a lens, optical fiber and the like is not needed, resulting in a compact apparatus, economy of mounting space, and cost effectiveness.

BRIEF DESCRIPTION OF THE DRAWINGS

The objects and advantages of the present invention will

FIG. 1 shows a relationship of distance between bar code sensor units and a film mask according to one embodiment of the present invention;

FIG. 10 shows signal waveforms outputted from the differential amplifiers and photosensors shown in FIG. 9;

FIG. 11A shows /signal waveforms outputted from the window comparators, FIG. 11B shows binaried data of the output from the window comparators, and FIG. 11C illustrates light measuring states of the binary signals by the photosensors;

DETAILED DESCRIPTION OF THE PREFERRED EMBODIMENTS

Figure 2A:
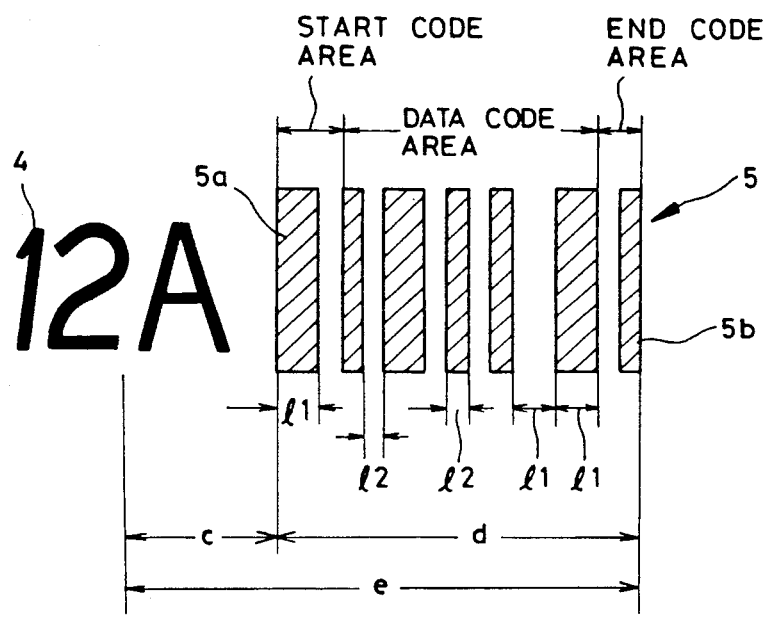
FIGS. 2A and 2B show examples of patterns of a frame number bar code and DX bar code printed on the photographic film shown in FIG. 1.

FIG. 1 shows a relationship of distances between a film mask and sensor units, as viewed from the light source. A photographic film 2, e.g., a 135 type roll negative film, has a plurality of frames 2a to 2d printed thereon and perforations 3 at both sides thereof. At the intermediate position between the film edges and perforations 3, frame numbers 4 are printed on one side and DX bar codes 6 are printed on the other side. The frame numbers 4 and frame number bar codes 5 are disposed at an equal pitch "b". The DX bar codes 6 also are disposed at the equal pitch "b". The bar codes 5 and 6 and frame numbers 4 are recorded in the form of latent images which are made visible after photographic development.

Two bar code sensor units 8 and 9 are mounted on both sides of a passage of the photographic film 2 to perform contact transmission type reading. The bar code sensor units 8 and 9 have the same structure so that each of the bar code sensor units 8 and 9 can read both the frame number bar code 5 and DX bar code 6. The bar code sensor units 8 and 9 are disposed remotely from the center of a film mask 10 at the print position (print stage) by a distance "a". A perforation unit 11 is mounted above the passage of perforations 3 to optically detect them. A light projecting unit (not shown) made of, e.g., LEDs, is disposed facing each sensor unit 8, 9, 11, with the photographic film 2 being interposed therebetween.

Figure 2B:
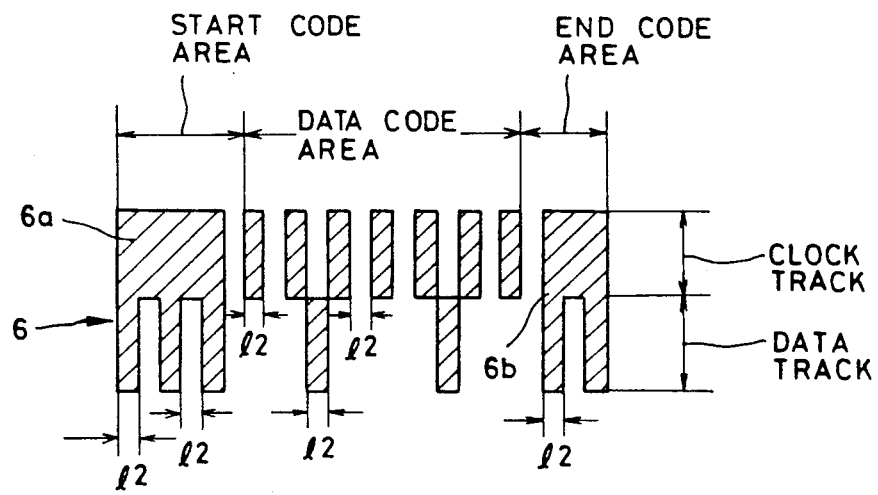

FIGS. 2A and 2B show the examples of patterns of the DX and frame number bar codes. As the frame number bar code 5, various types of bar codes conventionally proposed can be used. In this embodiment, three of nine code is used. This bar code has bars and spaces alternately disposed side by side. The bar or space with a larger width $l_1$ represents a binary "1", whereas the bar or space with a smaller width $l_2$ ($l_1/2$) represents a binary 0. Five data bars are recorded within the data code area, and the start and end code areas are provided at the opposite sides of the data code area to distinguish between the highest bit and lowest bit of the bar code data. A wider start bar 5a is recorded in the start code area, and a narrower end bar 5b is recorded in the end code area. The distance between the edge of the start bar 5a and the center of the frame number 4 is a constant value of "c". The total length of the data, start code and end code areas is a constant value "d". The total length of "c" and "d" is represented by "e".

Since three of nine code is not a binary notation, the lowest bit does not identify whether a decimal number thereof is an odd number or an even number. The bar frame number bar code shown in FIG. 2A represents "1000100001100" so that a code "001000011" is recorded in the data code area, which corresponds to a decimal number of "26" and the frame number of "12A". The frame number bar code (represented here in decimal notation for purposes of convenience) corresponds on a one-to-one basis to the frame number as shown in Table 1. Instead of "S", "O" is used by certain types of photographic film.

TABLE 1

| Frame Number Bar Code (Decimal) | Frame Number |
|---|---|
| 1 | S |
| 2 | SA |

TABLE 1-continued

| Frame Number Bar Code (Decimal) | Frame Number |
|---|---|
| 3 | 1 |
| 4 | 1A |
| 5 | 2 |
| 6 | 2A |
| . | . |
| 24 | 11A |
| 25 | 12 |
| 26 | 12A |
| . | . |
| 74 | 36A |
| . | . |

The DX bar code 6 is constructed of a clock track and a data track. Seven clock bars are recorded at a constant pitch ($2 \times l_2$) in the clock track, whereas data bars representative of a film type are recorded in the data track. At the opposite sides of the data code area, start and end code areas are provided. A start pattern 6a is recorded in the start code area, and an end pattern 6b is recorded in the end code area. The DX bar code 6 has bars and spaces both having the same width $l_1$ which is the same as the narrower width of the frame number bar code 5.

Figure 3:
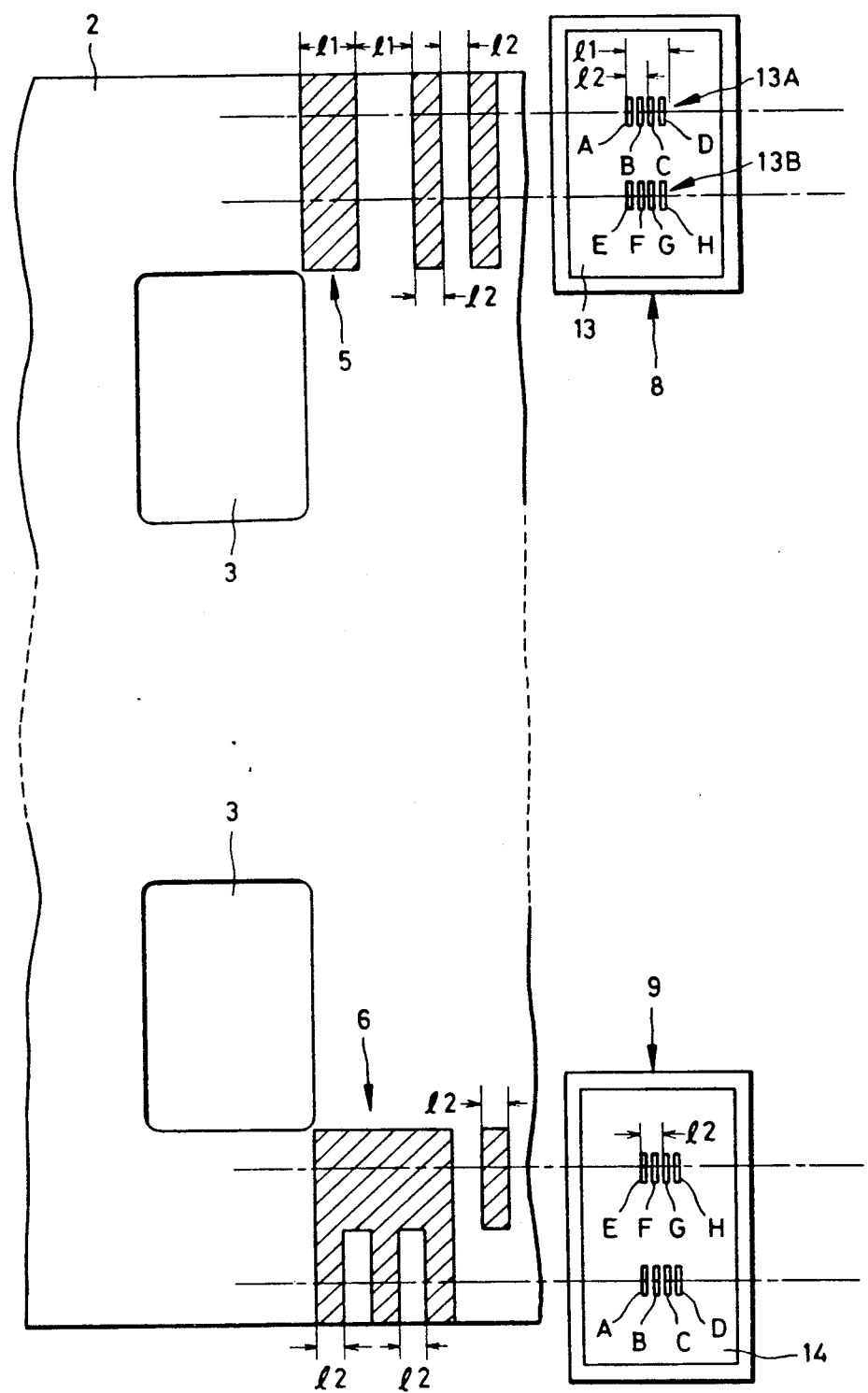
FIG. 3 illustrates a relationship between the bar code sensor units and bar codes.

FIG. 3 shows a relationship of positions of the bar codes and the bar code sensor units. The bar code sensor unit 8, 9 has at its bottom face an amorphous silicon substrate 13, 14 which requires no wire bonding for a sensor, thus allowing a compact size and contact transmission type reading for bar codes. An amplifier also is included in each of the bar code sensor units 8, 9.

Two photosensor arrays 13A and 13B are fabricated on the amorphous silicon substrate 13. The photosensor array 13A corresponds in position to the passage of the data track of the DX bar code when it is directed to the DX bar code 6, and the photosensor array 13B corresponds in position to the clock track of the DX bar code 6. The photosensor array 13A is constructed of four photosensors A to D disposed in the direction of film feeding, and the photosensor array 13B is also constructed of four photosensors E to H. These photosensors A to D and E to H are disposed at a pitch of half the length of $l_2$. Therefore, four photosensors can face at the same time a bar whose width is $l_1$, and two photosensors can face a bar whose width is $l_2$. The amorphous silicon substrate 14 has the same structure as that of the amorphous silicon substrate 13, with the same alphabet fixed to the corresponding photosensors. The perforation sensor unit 11 has also an amorphous silicon substrate on which a photosensor is fabricated facing the passage of the perforations 3.

Figure 4:
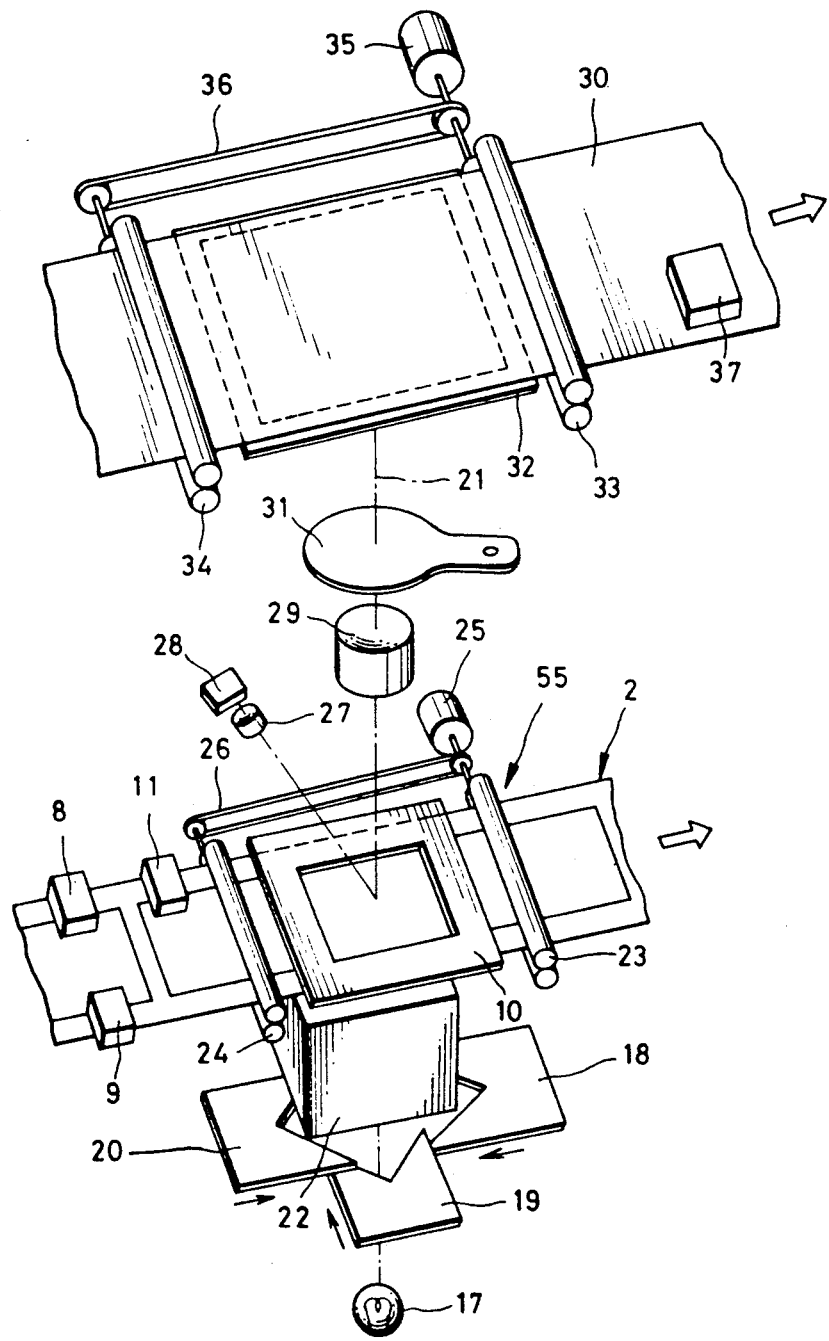
FIG. 4 is a schematic diagram showing a photographic printer used with the bar code sensors shown in FIG. 1.

FIG. 4 shows a photographic printer provided with the sensor units shown in FIG. 1. A yellow filter 18, a magenta filter 19, and a cyan filter 20 are mounted above a light source 17. These color correction filters 18 to 20 are caused to move in the plane perpendicular to the print optical path 21, and are adjustably inserted into the print optical path 21 in accordance with each color exposure amount, adjust the intensity of three color components of a print light.

A print light passed through the color correction filters 18 to 20 is sufficiently diffused within a mixing box 22 which has diffusion plates are mounted at opposite ends of a rectangular tube whose inside constitutes a mirror face. A film carrier 55 (seen in greater detail in FIG. 6) is mounted above the mixing box 22 to set the photographic film 2 at the film carrier 55. A film mask 10 is mounted at the print stage of the film carrier 55, and feed roller pairs 23 and 24 operatively interconnected via a belt 26 are disposed at opposite sides of the film mask. The roller pair 23 is coupled to a pulse motor 25. The photographic film 2 is nipped with the feed roller pairs 23 and 24 and fed in the direction shown by an arrow, one frame after another, so that a frame to be printed is positioned at the print stage.

A lens 27 and a sensor 28 are provided to measure the image within the frame which is set at the print stage. A print lens 29 is disposed above the print stage to enlarge the image within the frame which is set at the print stage and focus it onto a color paper 30. A shutter 31 and a paper mask 32 are disposed between the print lens 29 and the color paper 30. At opposite sides of the paper mask 32, two roller pairs 33 and 34 are mounted to nip and move the color paper one frame after another. The roller pair 33 is coupled to a pulse motor 35 whose rotation is transmitted via a belt 36 to the other roller pair 34.

A character printer 37 is disposed at the side of the paper mask 32 to print the printed frame number obtained based on the frame number bar code 5 read with one of the bar code sensor units 8 and 9, on the back of the exposed color paper 30, for example in the form of a dot pattern. Instead of the character printer 37, a paper mask print device constructed of a liquid crystal panel or a light emitting diode array may be mounted on the paper mask to print the frame number dot pattern simultaneously with photographic printing. Alternatively, a dedicated character printer and a magnetic floppy disk or the like for storing the printer frame numbers may be used. In this case, the magnetic floppy and the developed roll of color paper are set at the dedicated character printer to print the frame number and thereafter the color paper is cut into respective prints.

Figure 5:
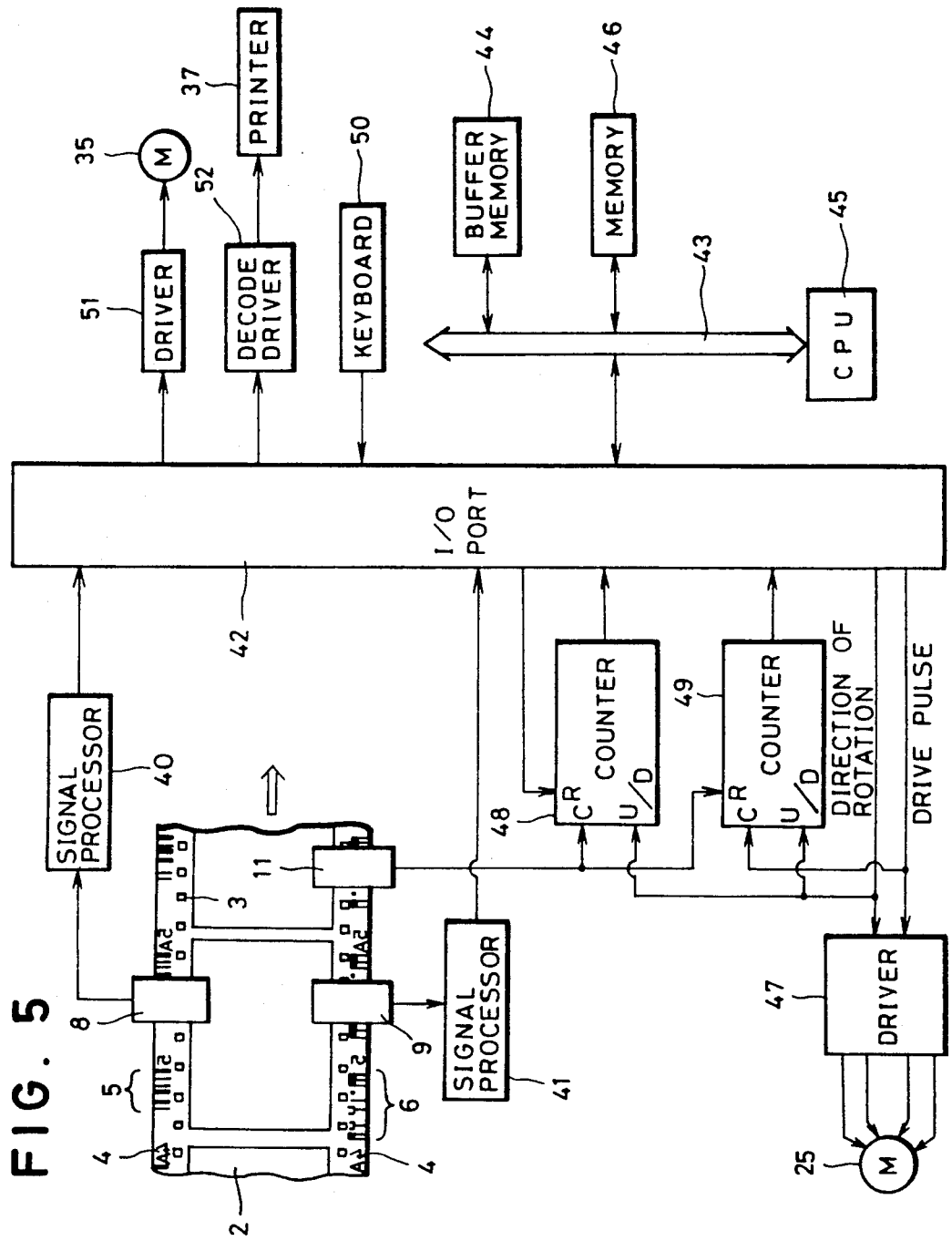
FIG. 5 is a block diagram of an electric circuit of the photographic printer shown in FIG. 4.

FIG. 5 shows a control circuit of the photographic printer. Signals outputted from the bar code sensor units 8 and 9 are processed at signal processing circuits 40 and 41, and are stored in a buffer memory 44 via an I/0 port 42, bus line 43, and CPU 45. The data stored in the buffer memory 44 are read out to determine the type of bar codes, and then the data are converted into bar code data.

CPU 45 sends a signal representative of rotation direction of the pulse motor 25 and drive pulses to the driver 47. to thereby control the rotation of the pulse motor 25 for moving the photographic film 2. The signal representative of the rotation direction is also inputted to the up/down terminals of a perforation counter 48 and a pulse counter 49. The perforation counter 48 counts up or down the signals outputted from the perforation sensor unit 11, in accordance with the rotation direction of the pulse motor 25 to measure the amount of the photographic film 2 fed. The perforation counter 48 is reset by CPU 45 when the photographic film is set at the film carrier 55.

The perforation counter 48 measures the amount of the photographic film 2 fed in units of the pitch of the perforations 3, resulting in a coarse measurement of the feed amount. In this connection, the pulse motor causes the photographic film 2 to move by one pitch of the perforations 3 using e.g., 20 drive pulses or steps. Therefore, the feed amount of the photographic film 2 can be measured more precisely by checking the number of drive pulses. In this embodiment, the count of the perforation counter 48 and the count of the pulse counter 49 which counts the drive pulses are used to perform precise measurement of the feed amount of the photographic film 2. The pulse counter 49 which measures the feed amount of the photographic film 2 within one pitch of the perforations 3 is reset in response to an output signal from the perforation sensor unit 11.

A keyboard 50 is provided with exposure correction keys. alphanumeric keys and operation keys. in a manner well known in the art. Reference numeral 51 represents a driver for driving the pulse motor 35, and reference numeral 52 represents a decode driver for driving the character printer 37.

Figure 6:
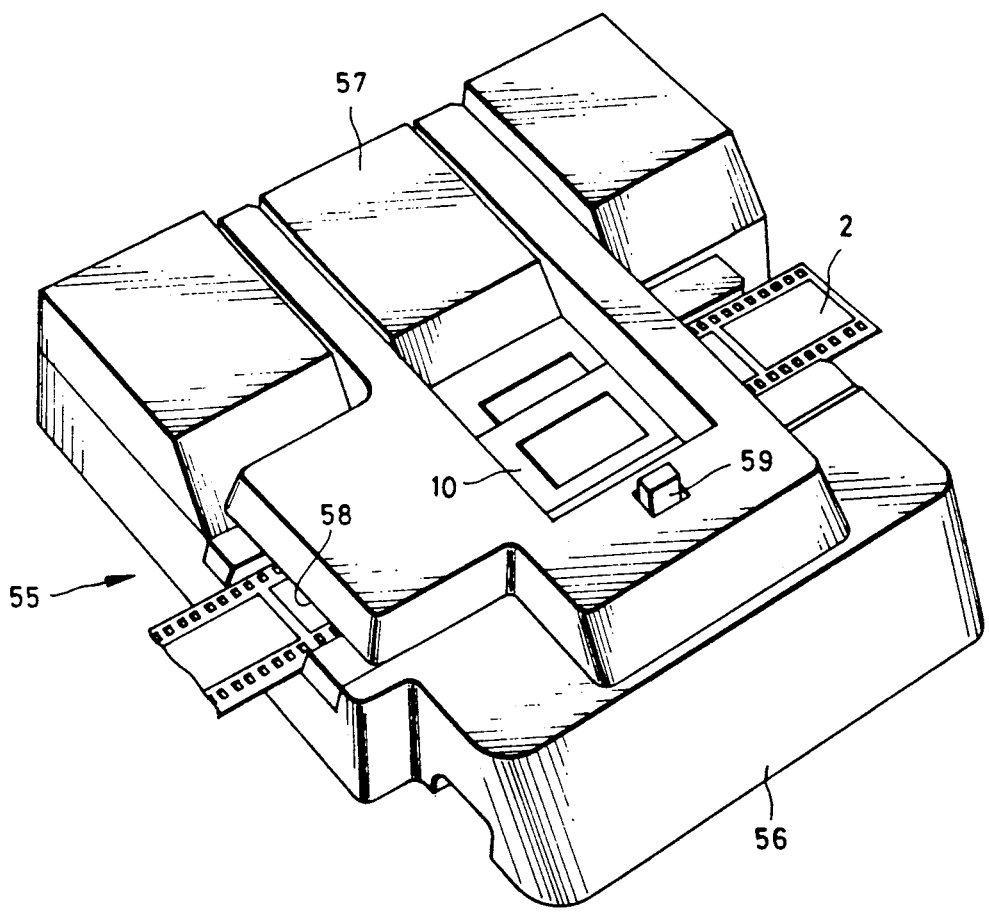
FIG. 6 is a perspective view of a film carrier.

FIG. 6 shows a film carrier 55 which is constructed of a carrier main body 56 and a lid member 57 pivotably coupled thereto. The carrier main body 56 has a film passage 58 formed therein and holds the lower rollers of the feed roller pairs 23 and 24. The lid member 57 holds the bar code sensor units 8 and 9, perforation sensor unit 11, film mask 10 and the upper rollers of the feed roller pairs 23 and 24. The lid member 57 is locked to the carrier main body 56 when the lid member is closed. Upon depression of a lock release knob 59, the lid member 57 is opened upwardly to expose the film passage 58 and to allow the photographic film 2 to be set therein. The light sources are mounted facing the bar code sensor units 8 and 9 on the side of the film passage 58.

Figure 7:
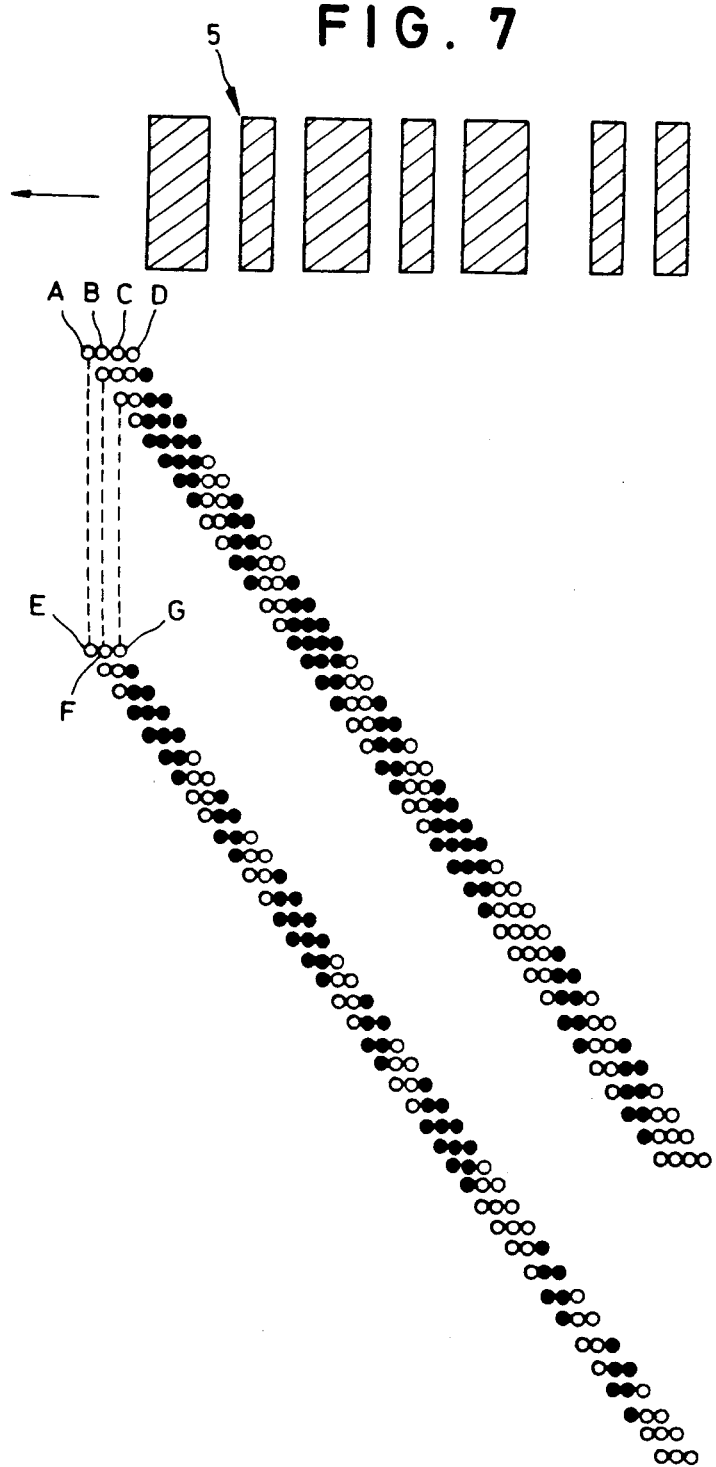
FIG. 7 illustrates light measuring states of a frame number bar code by photosensors.
Figure 8:
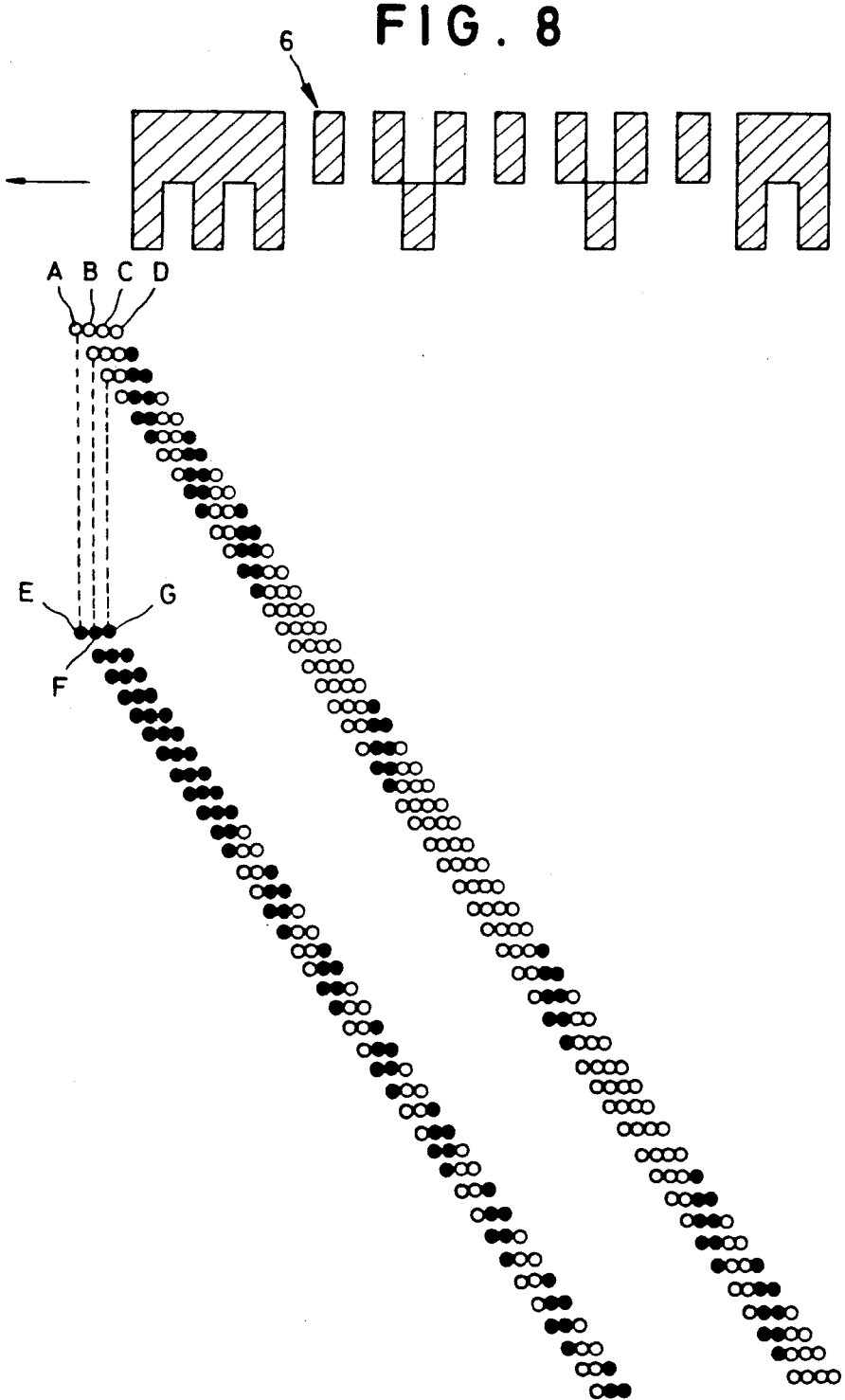
FIG. 8 illustrates light measuring states of a DX bar code by photosensors.

FIGS. 7 and 8 illustrate the light measuring states of the frame number bar code 5 and DX bar code 6 by the bar code sensor units. A solid circle represents a state where a bar faces a photosensor, and a white circle represents a state where a space faces a photosensor.

Figure 9:
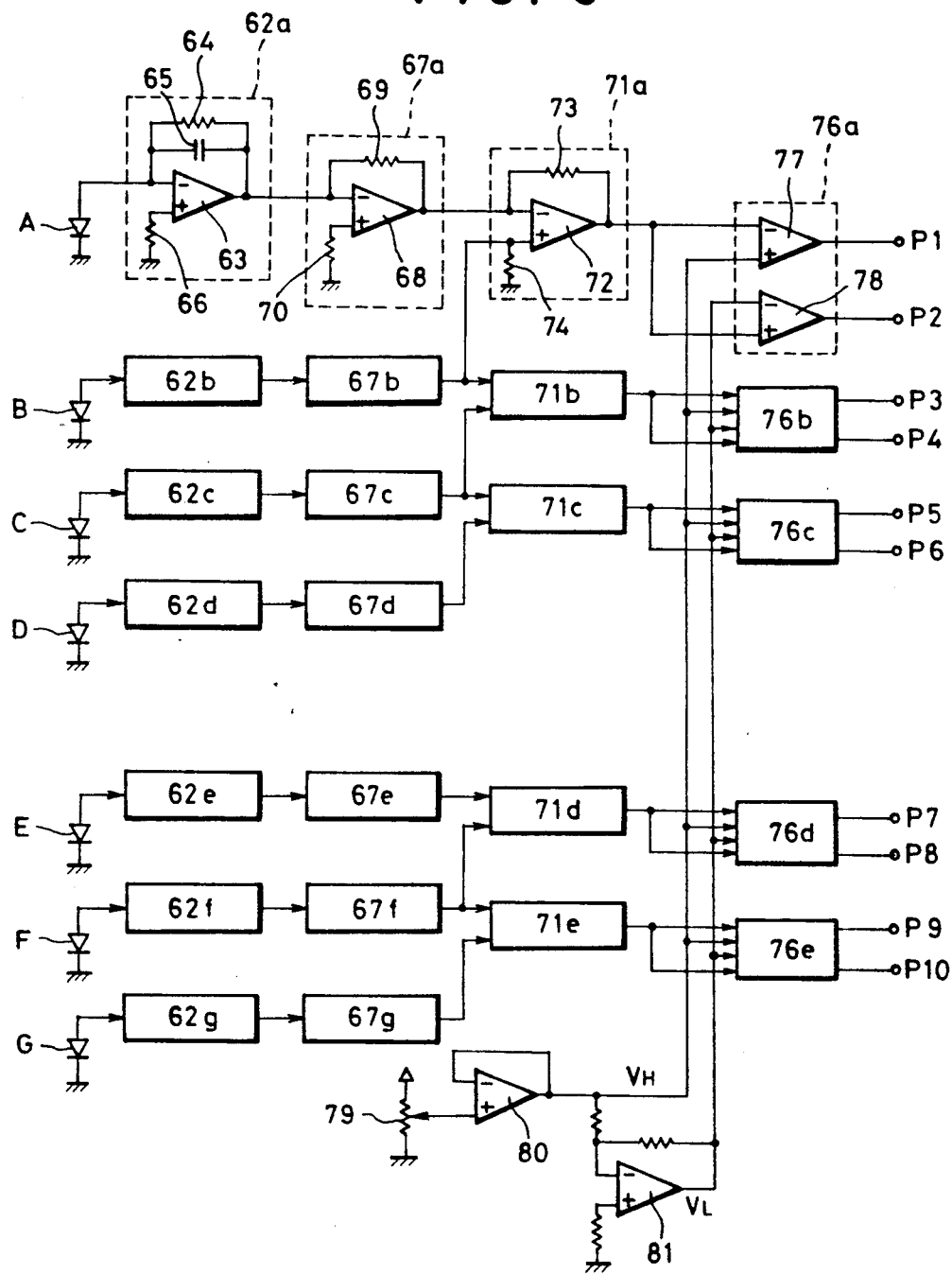
FIG. 9 is a circuit diagram of an example of the signal processing circuit shown in FIG. 5.

FIG. 9 shows an example of the signal processing circuit. The photosensor A is connected to a current-/voltage converter 62a in which photocurrent is converted into a voltage. The current/voltage converter 62a is mounted within the bar code sensor unit, and is constructed of an operational amplifier 63, resistor 64, capacitor 65 and resistor 66. An output signal from the current/voltage converter 62a is supplied to and amplified by an amplifier 67a constructed of an operational amplifier 68 and resistors 69 and 70. Signal processing for the photosensors B through G are carried out in a similar manner, and the corresponding circuits are shown as blocks with reference numerals only attached thereto. Four photosensors E to H may be used in detecting a clock track. However, the width of a clock bar is $l_2$ so that only three photosensors are necessary to detect the boundary between space and bar as described later. Thus, in this embodiment, the photosensor H is not used in the detection operation.

As the intensity of a light source changes (or because of other causes), the amplitude of an output signal from a photosensor may change greatly, resulting in unreliable binarization. In view of this, according to the present embodiment, difference signals between signals from two adjacent photosensors are used to deal with such a problem, and to facilitate detecting the boundary between space and bar. Five differential amplifiers 71a to 71e are provided to obtain the difference signals between signals from the adjacent two photosensors. Each of the differential amplifiers 71a to 71e is constructed of an operational amplifier 72, and resistors 73 and 74.

The output signal from the differential amplifier 71a is supplied to a window comparator 76a to be converted into two binary signals P1 and P2. The presence/absence of a boundary and the boundary state (from space to bar or vice versa) can be determined based on the states of two types of the binary signals P1 and P2. The window comparator 76a is constructed of a first comparator 77 supplied with a first reference voltage $V_H$ and a second comparator 78 supplied with a second reference voltage $V_L$ lower than $V_H$. Similarly, output signals from the differential amplifiers 71b to 71e are binarized at window comparators 76b to 76e to output binary signals P3 to P10. A potentiometer 79 is provided for setting the first voltage $V_H$ which is supplied via a buffer 80. The second voltage $V_L$ is supplied through an inverter amplifier 81 connected to the buffer 80.

Next, the operation of the signal processing circuit will be described with reference to FIG. 10 and FIGS. 11A to 11C. Signal waveforms shown in these drawings are provided on the assumption that no clearances are provided among respective photosensors. As the frame bar code 5 shown in FIG. 5 moves in the direction indicated by an arrow, the frame bar code 5 is detected with the respective photosensors A to G to output signals having the waveforms shown in FIG. 10. The output signals from the photosensors A to G are converted into voltages at the current/voltage converters 62a to 62g, and are amplified by the amplifiers 67a to 67g. These amplified signals are inputted to the differential amplifiers 71a to 71e to be converted into the signals having the waveforms shown in FIG. 10. The obtained difference signals are inputted to the window comparators 76a and 76e and are converted into the binary signals P1 to P10 shown in FIG. 11A. CPU 49 samples these binary signals P1 and P2 at a proper sampling rate to obtain the data shown in FIG. 11B.

If a boundary between bar and space is present, the two signals outputted from the window comparator take different levels. What type of a boundary is present between two adjacent photosensors can be determined based on which value of "0" and "1" the binary signals P1 and P2 take. Specifically, if P1 is "1" and P2 is "0", a space faces the photosensor A. whereas a bar faces the photosensor B. On the other hand, if P1 is "0" and P2 is "1", a bar faces the photosensor A, whereas a space faces the photosensor B. Similar relations stand between binary signals P3 and P4, and between binary signals P5 and P6. Based on such relations, the light measuring states of the photosensors A to D can be identified as shown in FIG. 11C. The photosensors E to G take the same states as the photosensors A to C.

The operation of the foregoing embodiment now will be described. Upon opening the lid member 57 of the film carrier 55, the film mask 10 and the upper rollers of the two feed roller pairs 23 and 24 are retracted upwardly to expose the film passage 58. The photographic film 2 is then set on the film passage 58, and the lid member 57 is moved to the original position so that the perforation counter 48 is reset at that time. After loading the photographic film 2 the keyboard 50 is operated upon to make CPU 45 output a signal representative of a forward rotation direction. This forward rotation signal is inputted to the perforation counter 48 and pulse counter 49 to place them in an addition count state.

CPU 45 outputs a predetermined number of drive pulses and sends them to the driver 47 to rotate the pulse motor 25 in the forward or normal direction. As the pulse motor 25 rotates in the normal direction, the photographic film 2 is nipped with the two feed roller pairs 23 and 24 and moved in the direction indicated by the arrow in FIG. 4 by one frame. The drive pulses are also supplied to the pulse counter 49 which counts them.

During the transportation of the photographic film 2, the perforation sensor unit 11 detects a perforation 3 and sends a detection signal to the perforation counter 48 and pulse counter 49. The perforation counter 48, which has been set in an addition count state increments its content each time the detection signal is inputted thereto, to count the number of perforations 3. The pulse counter is reset each time the detection signal is supplied from the perforation sensor unit 11, to start and continue measuring the fine feed amount of the photographic film 2 until the next perforation 3 is detected. The feed amount "H" of the photographic film 2, using as a reference the time when the first perforation was detected, therefore can be obtained by the following equation.

$$H = \alpha \times Pn + Dn \quad (1)$$

where "Pn" represents a count of the perforation counter 48', "Dn" represents a count of the pulse counter 49', and "α" represents the number of drive pulses corresponding to one pitch of the perforations 3. The film feed amount is represented using the number of drive pulses in this embodiment. However, it also may be represented by millimeters or inches.

Figure 12:
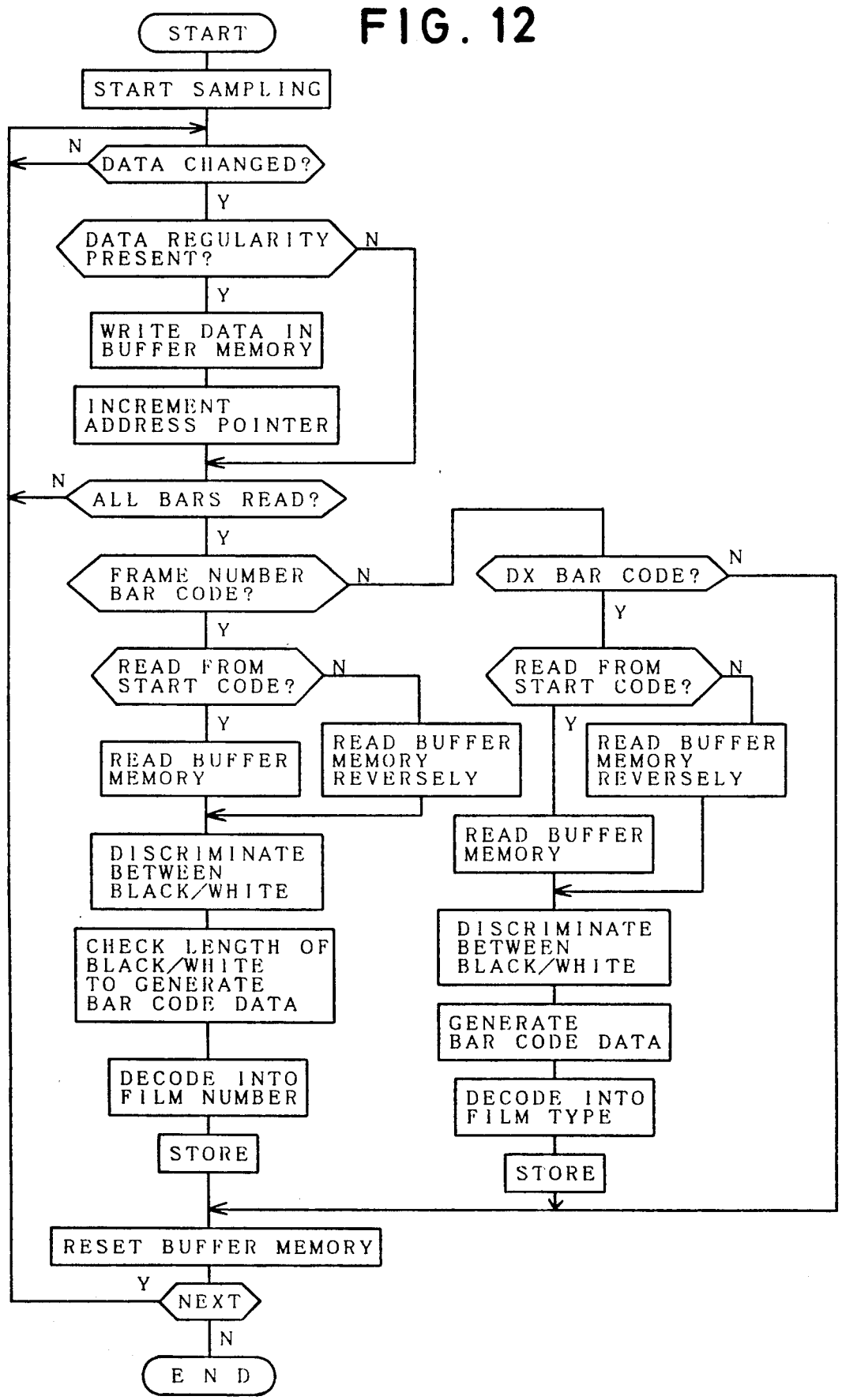
FIG. 12 is a flow chart showing the bar code reading procedure.

During the transportation of the photographic film 2, the bar code sensors 8 and 9 read the corresponding frame number bar code 5 and DX bar code 6 while contacting the bar code and detecting transmitted light. The bar code reading procedure will be described with reference to FIG. 12. The bar code sensor units 8 and 9 measure light while contacting the sides of the photographic film 2 under transportation. During this light measurement, binary signals P1 to P10 are outputted from the signal processing circuits 40 and 41. CPU 45 samples the binary signals P1 to P10 and store them in a first register (not shown) of CPU 45. CPU 45 compares the preceding binary signals P1 to P10 stored in a second register (not shown) with the current binary signals P1 to P10 stored in the first register, to then determine if a change in data has occurred.

The photographic film 2 may sometimes moved backward due to backlash or the like of the film feeding mechanism. If the amount of backward movement exceeds the pitch of the photosensors, then the same bar or space of the bar code will read twice. The data obtained by reading the boundary between bar and space changes regularly in accordance with the direction of feeding the photographic film 2. For instance, with respect to the photosensors A to E, in FIGS. 7 and 8, the boundary between bar and space moves sequentially from an intermediate of "D and C", to "C and B", and to "B and A", so that the read-out data is regular.

When CPU 45 judges that there is a change in data, it determines whether or not there is any regularity with respect to binary signals P1 to P6 or P7 to P10. If there is, the sampled data are written in the buffer memory 44, and the address pointer is incremented. As will be described later only the binary signals P1 and P2 are necessary for the frame number bar code, and the binary signals P1 and P2 and additional binary signals P7 to P10 sufficient for the DX bar code. Therefore, only the binary signals P1 and P2 and P7 to P10 may be written in the buffer memory 44.

If there is no data regularity, it means that the photographic film 2 was moved backward. Therefore, writing into the buffer memory 44 is stopped until regularity is resumed, i.e., until the photographic film 2 is caused to start being fed and returned to the position where the data were read. If there is no regularity, the buffer pointer may be decremented by "1".

If all the binary signals P7 to P10 take a value of "0" even after performing a predetermined number of samplings, CPU 45 checks whether the pulse motor 25 is rotating. If so, CPU 45 decides that all the bars have been read. Upon completion of reading of all the bars, the film feed amount is calculated using the counts of the perforation counter 48 and pulse counter 49 in accordance with the equation (1). Until the calculation is performed, the end code had passed the sensor unit by a predetermined distance which is subjected to subtraction to obtain the film feed amount "H1" at the time of completion of reading all the bars. The film feed amount "H1" is stored in a RAM of the memory 46.

Upon completion of reading all the bars, CPU 45 judges, based on the data configuration, whether the read-out bar code is the frame number bar code 5, DX bar code 6 or frame number 4. This judgement is conducted based on the presence/absence of a data track, the configuration of the start code or end code. If the read-out bar code is judged as the frame number, the buffer memory 44 is reset to prepare for the next bar code reading.

If the data read with one of the sensor units are judged as the frame number bar code 5, then the "N" sets of binary signal data stored in the buffer memory 44 at the first address to the N-th address are sequentially read-out. The number N of binary signal data sets corresponds to the amount of data within the data code area, which is 5 in the case of the frame number bar code shown in FIG. 7. Since the boundary can be detected by using only the two types of binary signals from the window comparator, only the data of binary signals P1 and P2, for example, are read out. Through comparison between the two sets of data of the two binary signals P1 and P2, it becomes possible to discriminate between black and white with respect to the photosensor A. Next, it is judged whether the start data are for the start code or for the end code based on the length of black bar, i.e., the number of bits.

If it is judged that the frame number bar code 5 was read from the start code side, then the addresses at which the binary signal data sets are stored are used to sequentially read out the binary signal data sets P1 and P2 from the buffer memory 44. Alternatively, if it is judged that the frame number bar code 5 was read from the end code side, then the addresses are used from the highest address to read out the binary signal data sets in the reverse order to thereby make the bits on the start code side as the lowest bits.

Next, the length of black and white (number of bits) is judged to convert it into the binary signal with the longer one set as "1" and the shorter one as "0", to generate the bar code data. The bar code data then are decoded, with reference to a frame number bar code data table stored in a ROM of the memory 46, into a frame number. The actual frame number decoded is a numerical value as shown in Table 1. The obtained frame number is stored in a RAM of the memory 46 in place of the previously stored old frame number.

If the bar code is judged to be the DX bar code 6, then it is determined whether the DX bar code 6 was read from the start code. If the DX bar code was read from the end code, then the contents of the buffer memory 44 are read in the reverse order. For the data of the DX bar code 6, the binary signals P7 to P10 are read to discriminate between black and white with respect to the photosensor E. Next, the addresses are obtained where the black and white for the photosensors E and F differ, to read the binary signals P1 and P2 from the buffer memory 44 at the obtained addresses. The black or white with respect to the photosensor A is determined based on the binary signals P1 and P2 to generate the bar code data with "0" assigned to white and "1" assigned to black. Consequently, the DX bar code 6 is detected while checking its data track status at the boundaries of the bar and space recorded on the clock track.

The bar code data are decoded, with reference to a DX bar code table stored in a ROM of the memory 46, into a film type. The obtained film type (actually, a numerical value corresponding to the film type) is stored in a RAM of the memory 46 in place of the previously read-out film type.

After storing the frame number and film type, the buffer memory 44 is reset to advance to reading the next bar code in the manner described in the foregoing. The just read-out frame number and film type are replaced with the data previously read. At the same time the film feed amount "H1" at the end of reading the bar code is replaced with a new one.

The photographic film 2 is then fed upon rotation of the pulse motor 25 which is controlled through constant feeding for a distance corresponding to the pitch of frames or through detection of the notch formed in each frame, so that the frame to be printed is set at the print stage. After setting the frame, CPU 45 calculates the number of a frame to be printed. First, using the counts of the perforation counter 48 and pulse counter 49, the film feed amount "H2" is calculated in accordance with the equation (1). In this embodiment, the film feed amount "H1" when the bar code sensor unit 8 detected the passage of the end bar 5b is stored in a RAM of the memory 46, so that by obtaining a difference therebetween, the transportation amount "x" of the end bar 5b of the last read frame number bar code can be obtained.

Since the distance "L" from the center of the film mask 10 to the frame number is given by:

$$L = (a - x - e) \quad (2)$$

the number of frames "n" and the remainder "m" can be obtained by dividing L by the pitch "b" of frame numbers. Namely:

$$L/b = n \text{ with remainder "m"} \quad (3)$$

The remainder "m" corresponds to a distance from the frame number at the right side within the film mask 10 to the center thereof. Since the pitch "b" of the frame number is a constant value, the following equation holds, taking "M" as the distance from the frame number at the left side within the film mask 10 to the center thereof:

$$b = m = M \quad (4)$$

It is possible to know the frame number nearer to the center of the film mask 10 based on which value of "M" and "m" is larger or smaller. Specifically, taking "N" as the decoded numerical value of the read-out frame number bar code, the decoded numerical value "Y" of the bar code of the frame number nearer to the center of the frame 2a becomes:

for m equal to or smaller than M $$Y = N - n \quad (5)$$

and for m larger than M $$Y = N - n - 1 \quad (6)$$

When the photographic film 2 is transported from the film mask 10 to the bar code sensors 8 and 9, "+x" is used instead of "−x" in the above equations (2) and (6). When the film feed amount is measured from the start bar 5a, "c" is used instead of "e". When the frame number is larger on the side of the film mask 10 than on the side of the bar code sensors 8 and 9, "+e" or "+c" are used instead of "−e" or "−c". and "+n" instead of "−n".

For the case shown in FIG. 1, assuming that a=90, b=15, x=3, e=8, and N=30, then $$L = 90 - 3 - 8 = 79$$

$$79/15 = 5 \text{ with remainder } 4$$

Since 4 is smaller than 11, the values of "N" and "n" are substituted into the equation (4). The result is:

$$Y = 30 - 5 = 25$$

The frame number indicated by decimal number "25" of the decoded frame number bar code is "12". Therefore it is determined that frame number "12" is positioned nearest to the center of the film mask 10. As above, even if a read error occurs, the film feed amount after the time when the latest bar code was read is measured to identify the number of a frame positioned at the film mask 10, so that once the bar code is read, there is no problem even if a read error occurs thereafter.

After calculating the frame number and storing the frame number data in the memory 63, the exposure light amount for each color is calculated by measuring light with the sensor 28. In accordance with the calculated exposure light amount, the amount of insertion of the color correction filters 18 to 20 into the optical path 21 is adjusted. After this adjustment. the shutter 31 is opened to expose light to the color paper 30.

After the exposure, the pulse motor 35 is rotated to feed the color paper 30 by one frame and set the unexposed portion at the exposure stage, with the color correction filters 18 to 20 being retracted to their normal positions. After the color paper 30 is fed. CPU 45 reads the frame number from the memory and sends it to the decode driver 52. The decode driver 52 drives the character printer 37 to print the frame number "12" at the back of the exposed frame. In a similar manner, the frame number of each frame is read to make a print thereof, and the read-out frame number is printed at the back of the color paper 30.

Figure 13:
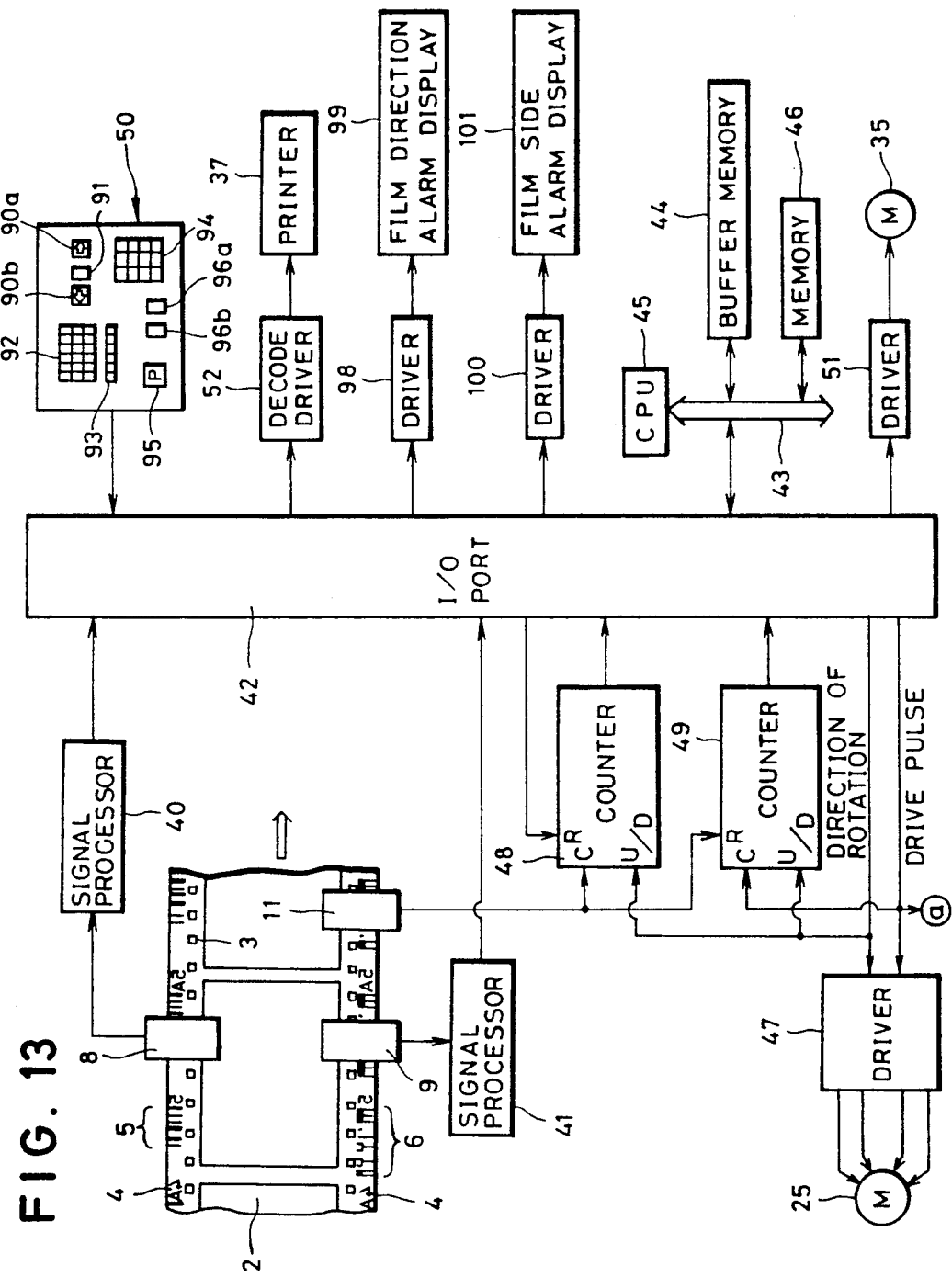
FIG. 13 is a block diagram of an electric circuit according to another embodiment of this invention, in which an alarm is issued when photographic film placed on the wrong side and faces in the wrong direction.

If the direction of the photographic film 2 is limited to one direction with respect to the film carrier 55, then the programs are simplified because it is not necessary to discriminate between the bar codes. In this case, if the wrong film direction is employed, the bar code cannot be read correctly. FIG. 13 is a block diagram showing an embodiment in which, if a wrong film direction is set, an alarm display is output. In FIG. 13, similar elements to those in FIGS. 1 to 12 are represented by using identical reference numerals, and the description therefor is omitted. The keyboard 50 is provided with fine adjustment keys 90a and 90b, a pass key 91 for passing one frame frame color correction keys 92, density correction keys 93, alphanumeric keys 94, a print key 95 for instructing the start of printing, and film direction designating keys 96a and 96b.

The film direction designating key 96a is used for the case in which the photographic film 2 is set at the film carrier 55 with the frame having the smallest frame number positioned at the top. On the other hand, the film direction designating key 96b is used for the case in which the photographic film 2 is set at the film carrier 55 with the frame having the largest frame number positioned at the top. Upon designation of the film direction, the type of bar codes read with the bar code sensor units 8 and 9 can be identified, and also whether the bar code is read from the start code or from the end code can be identified. With the identified bar code type and reading direction given, it is possible to know the film direction and film side (i.e., it is set normally or in reverse). If the film direction is opposite to the designated one, the driver 98 drives a film direction alarm display 99. If the photographic film is set in reverse, the driver 100 drives a film side alarm display 101. Lamps, buzzers, liquid crystal display panels or the like may be used as the alarm display 99 and 101. If a liquid crystal panel is used, the alarm displays 99 and 101 may be integrated.

Figure 14:
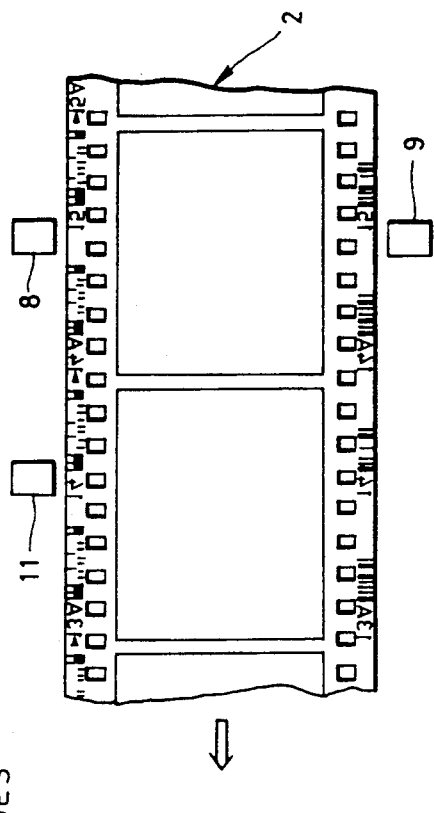
FIG. 14A to 14D illustrate the setting conditions of a photographic film.
Figure 14:
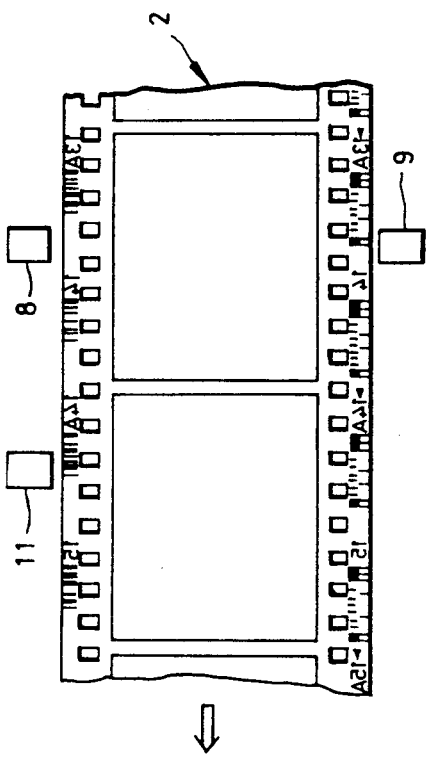
Figure 14:
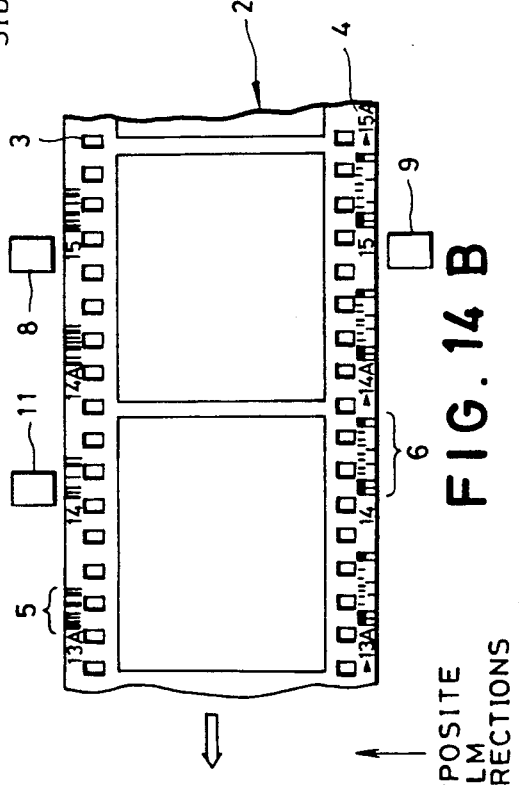
Figure 14:
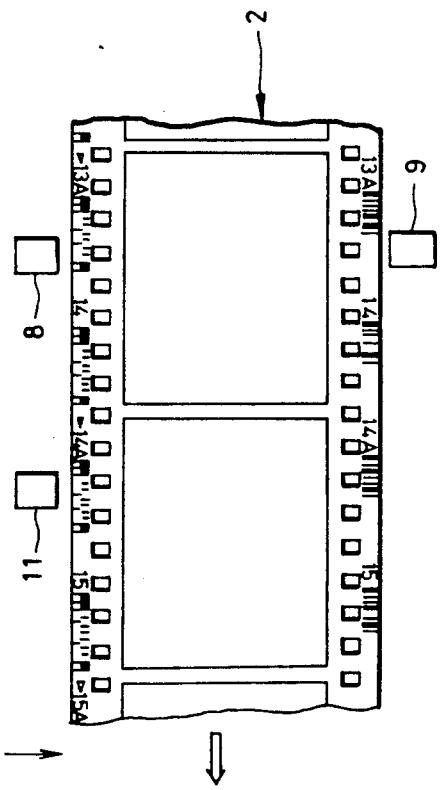
Figure 15:
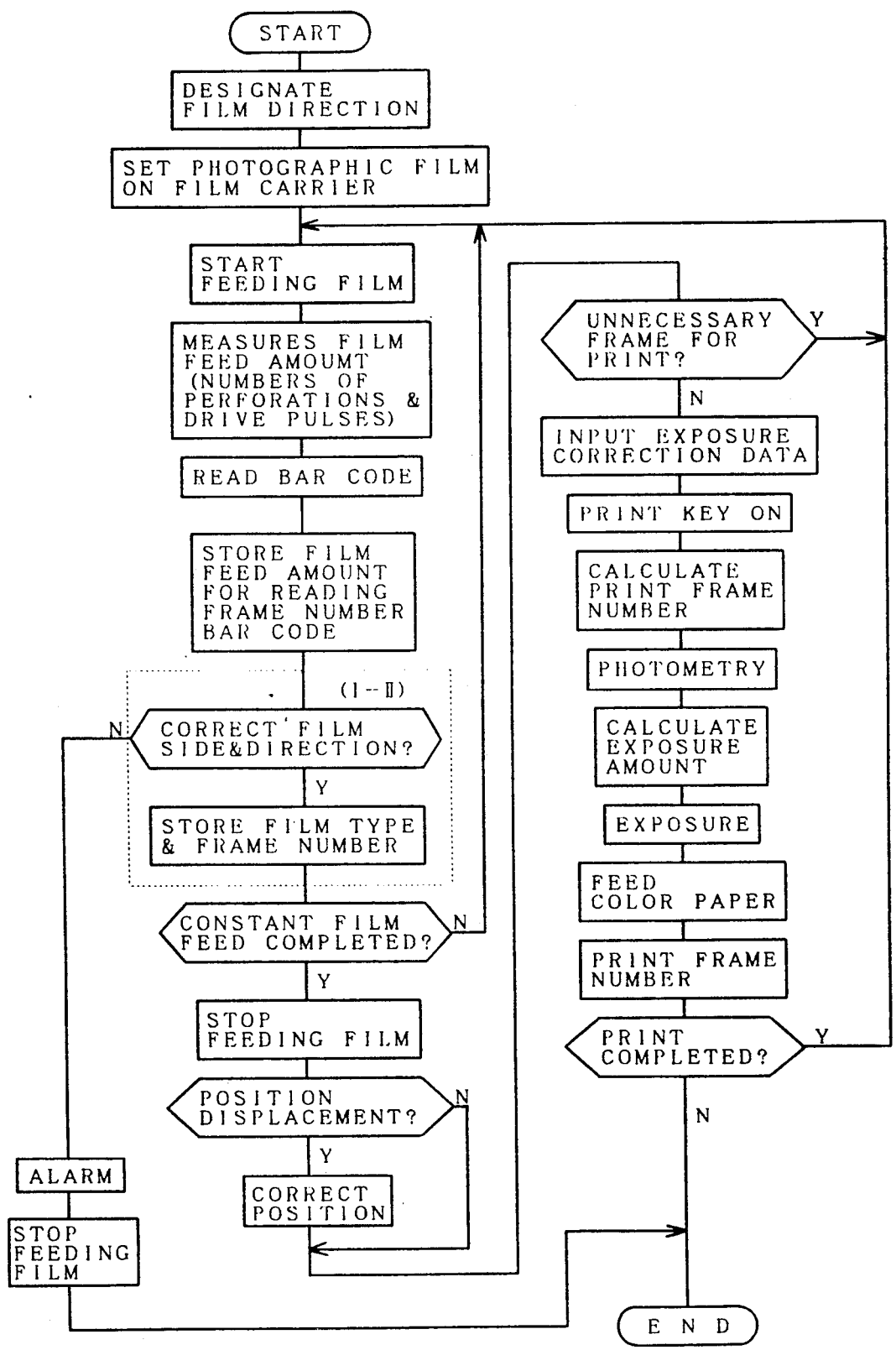
FIG. 15 is a flow chart illustrating a printing procedure using the embodiment shown in FIG. 13.

Next, the operation of the above embodiment will be described briefly with reference to FIGS. 13 to 16. First, using the keyboard 50, the direction of the photographic film 2 is designated. For instance, as shown in FIG. 14A, if the photographic film is to be set with the frame having the smaller frame number positioned at the top, the film direction designating key 96a is actuated. Next, the photographic film 2 is set as above to start feeding it. As the photographic film 2 is fed, the bar code is read with the bar code sensor units 8 and 9 in accordance with the procedure described previously. CPU 45 determines whether the data read with the bar code sensor unit 8 from the buffer memory are for the designated bar code based on the stored data. This judgement can be conducted based on whether there is a data track or not, or the start code or end code. In this embodiment, since the direction of the photographic film is assumed to be as shown in FIG. 14A, it is determined whether the bar code sensor 8 read the frame number bar code 5 or not. If it did, then it is determined whether the data was read from the start code or not. If the data were read from the end code, the photographic film 2 was set as shown in FIG. 14D so that the film direction alarm display 99 and film side alarm display 101 output an alarm, and the pulse motor 25 is stopped to forcibly stop feeding the photographic film 2.

If the bar code sensor unit 8 read the DX bar code 6, it is determined whether the data were read from the start code or not. If affirmative, the photographic film 2 was set as shown in FIG. 14C so that the film side alarm display 101 outputs an alarm, and the photographic film feeding is stopped. If the data were read from the end code, the photographic film 2 was set as shown in FIG. 14B so that the film direction alarm display 99 outputs an alarm.

For the wrong film direction and side, the lid member 57 of the film carrier 55 is opened so that the photographic film 2 can be set correctly in accordance with the content of the alarm display. For the wrong film direction. the film direction designating key 96b may be actuated, and the pass key 91 operated to restart the film feeding. If the data read with the bar code sensor unit 8 are neither the frame number bar code 5 nor the DX bar code 6, it is determined that the bar code sensor unit read the frame number 4, and the read-out data are cancelled to prepare for reading the following bar code. If the film direction and film side are correct, generation of bar code data, decoding, and data write renewal are performed in the manner described previously.

Figure 16:
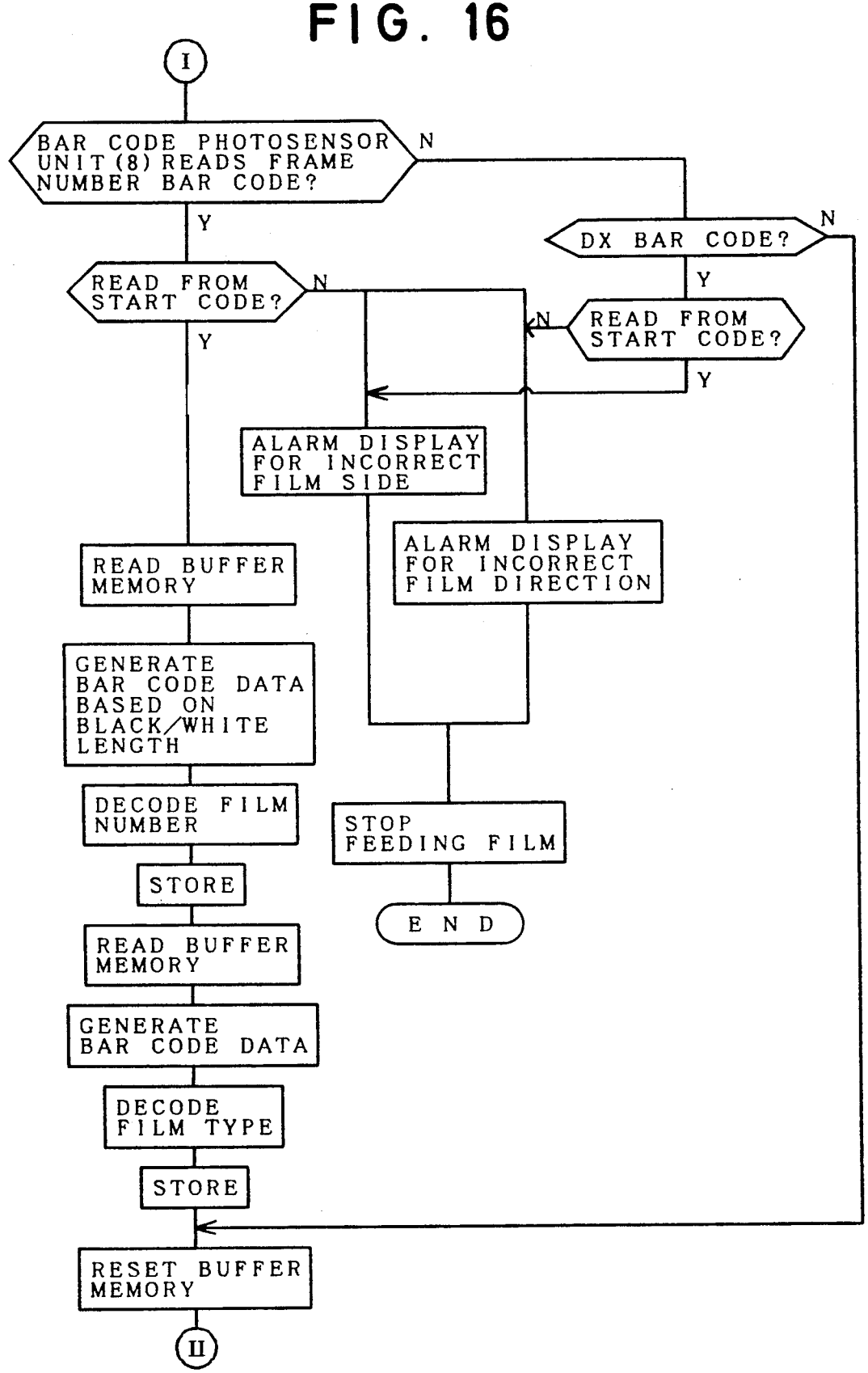
FIG. 16 is a flow chart illustrating the discrimination procedure for a film number and film type as shown in FIG. 13.
Figure 17:
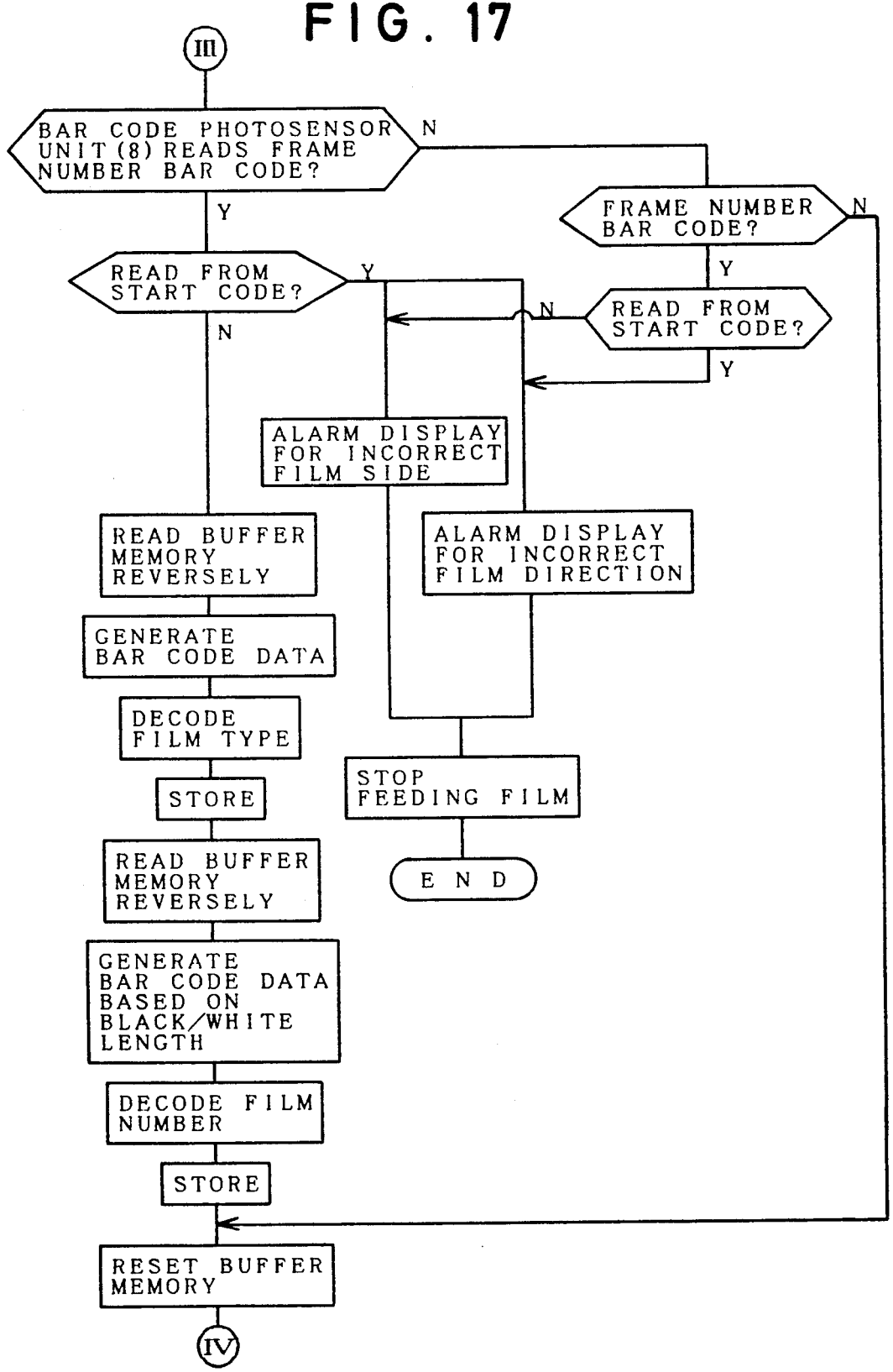
FIG. 17 is a flow chart similar to FIG. 16 for the case in which the film direction is changed.

If the photographic film 2 is set with the frame having the larger number positioned at the top, the procedure shown in FIG. 17 is used instead of that of FIG. 16. In this case, the film direction designating key 96b of the keyboard 50 is actuated. Only for the case where the photographic film 2 is set as shown in FIG. 14A, the bar code sensor units 8 and 9 can read the frame number bar code 5 and DX bar code 6. For the other cases, an alarm display is effected by means of the film direction alarm display 99 and film side alarm display 101.

After completion of feeding the photographic film 2 by a predetermined amount, the pulse motor 25 is caused to stop. Thereafter, film inspection is carried out while monitoring the film through the film mask 10. In the film inspection, it is first checked if the first frame is correctly positioned at the print stage. If there is a shift in position alignment, the fine adjustment key 90a or 90b matching the shift direction is operated to slowly rotate the pulse motor in the forward or backward direction to correct the position of the frame. During this adjustment operation, since the perforation counter 48 and pulse counter 49 are set at the addition count state for the forward direction and at the subtraction count state for the backward direction, the counters 48 and 49 operate to count up or down accordingly.

Next, it is determined whether the frame, correctly aligned at the film mask 10, is to be printed. If the frame has no image therein, an out-of-focus image, or an extraordinary over exposure or under exposure image, then it is determined that the frame need not be printed. For such an unnecessary frame, the pass key 91 is operated to feed one frame to thereafter perform position alignment for the second frame. For a frame which is to be printed, it is determined whether a subject failure occurs by the automatic exposure control. If it is anticipated that the subject failure will occur and the finished print of a main object will have poor density and color, then the density correction key 93 and color correction key 92 are operated to input manually the exposure correction data.

Upon actuation of the print key 95, calculation of the frame number and the exposure amount are performed as described previously. Thereafter, the shutter 31 is opened to expose light onto the color paper 30. When the exposed portion of the color paper 30 reaches the character printer 37, the frame number is printed with the character printer 37.

In the embodiment shown in FIG. 13, the alarm displays for the film direction and film side are output separately. However, in order to simplify the circuit arrangement, such alarm displays may be output without discrimination therebetween. In this case, since the direction of reading the bar code and the type of bar codes to be read with the two bar code sensor units 8 and 9 are unanimously determined, the bar code reading procedure can be simplified, and only the data necessary for generating the bar code data are written in the buffer memory 44. After writing the data, the bar code data are generated and it is determined whether the data are normal or not. If not, an alarm is output.

In the photographic printer having an alarm display described above, the bar code may be read irrespective of the film direction as in the embodiment shown in FIG. 5. In this case, only a wrong film direction is alarmed. The film direction is selectively designated by the film direction designating keys 96a and 96b in the embodiment shown in FIG. 13. However to simplify the structure, the film direction keys 96a and 96b may be omitted, and the film direction may be fixed so as to be one particular direction. The determination of the setting conditions of the photographic film 2 also is applicable to photographic films now available in the market with only DX bar codes printed along the edge.

Further, in order to perform photographic printing efficiently, the photographic film 2 may be fed first in one direction to perform for each frame a film inspection (position setting, exposure amount calculation) and frame number reading, and then the photographic film 2 is fed in the opposite direction to automatically position each frame and consecutively perform photographic printing based on the position data obtained by the film inspection.

Figure 18:
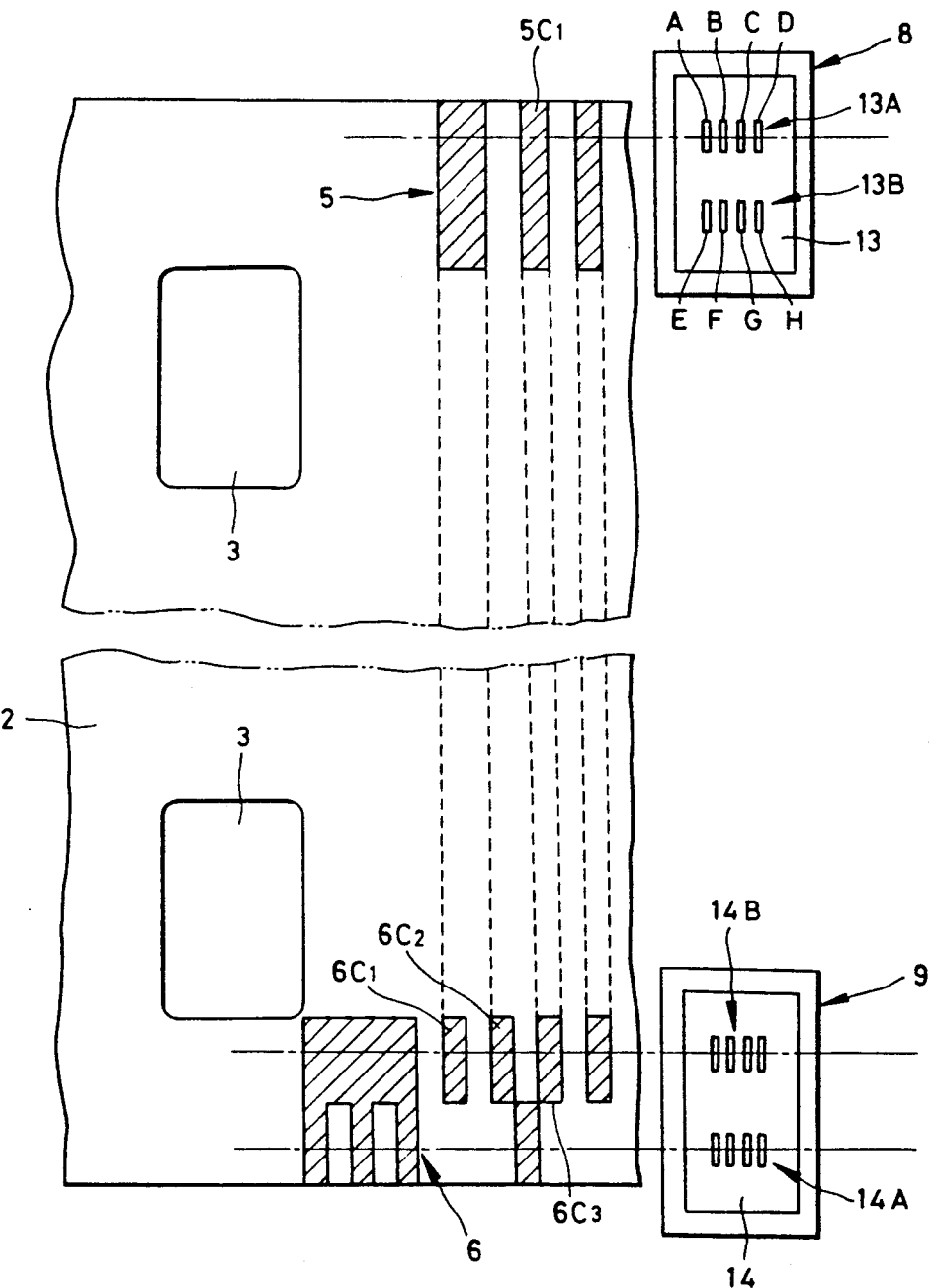
FIG. 18 is a view similar to FIG. 3 which illustrates another embodiment of this invention, where a frame number bar code is read using a DX bar code clock track.

As shown in FIG. 18, if the frame number bar code 5 is recorded in positional correspondence to the DX bar code 6, then it is possible to readily read the frame number bar code using the clock track of the DX bar code 6. Specifically, the edge of the first clock bar 6C1 recorded on the data code area of the DX bar code 6 coincides in position with one edge of the start bar 5a of the frame number bar code 5. The edge of the second clock bar 6C2 coincides in position with the other edge of the start bar 5a. Similarly, the edge of the clock bar 6C3 coincides with the edge of the data bar 5C1. Thus, it is possible to read the frame number bar code 5 using the clock track of the DX bar code 6. Even if such positional coincidence between two bar codes is not present, the bar code sensor unit 8 may be mounted at a position in which the positional difference can be eliminated so that the frame number code can be read using the clock track of the DX bar code 6.

Figure 19:
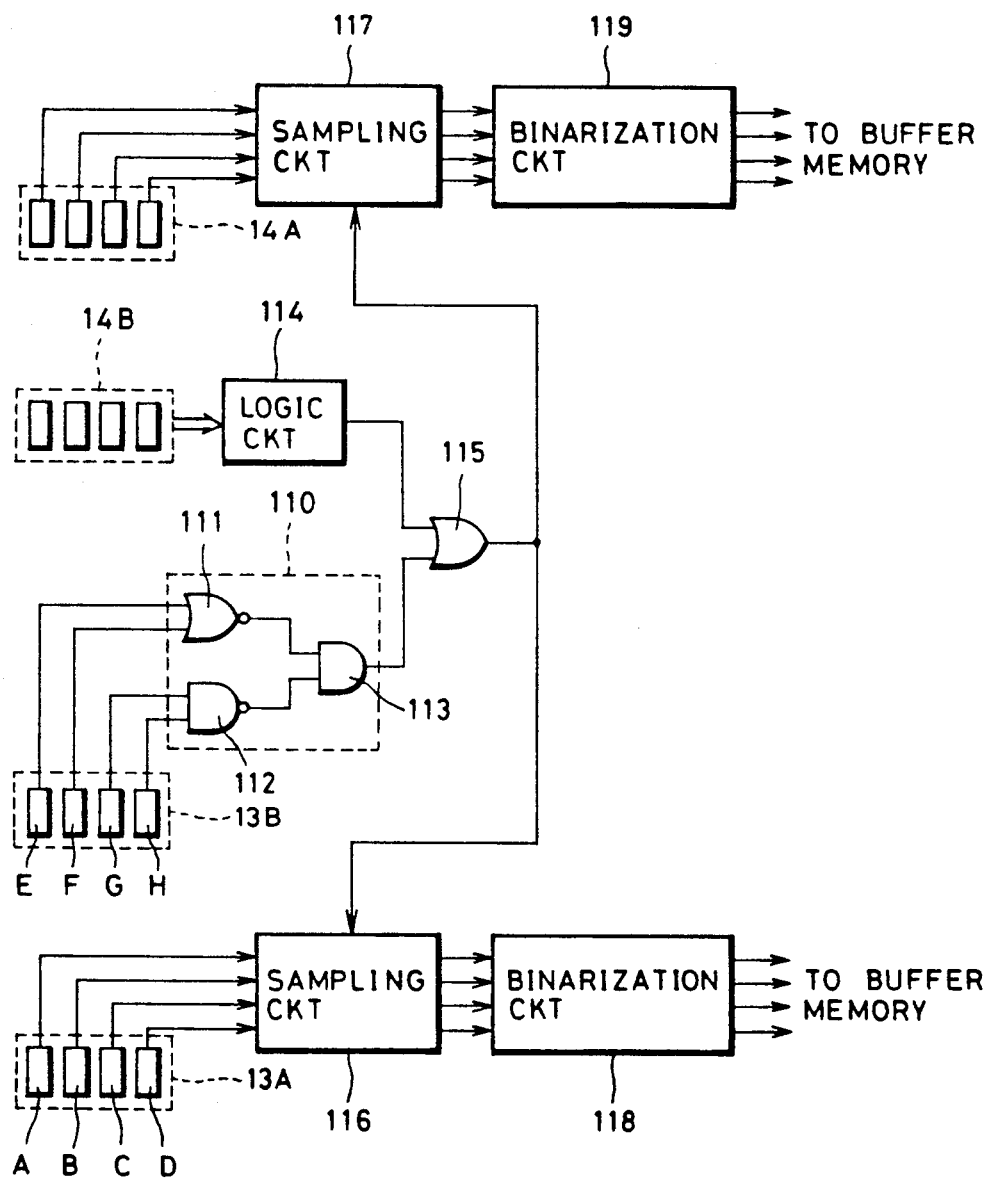
FIG. 19 is a block diagram for a circuit reading a bar code of a photographic film as shown in FIG. 18.

FIG. 19 is a block diagram showing an example of a circuit used for reading the frame number bar code with the aid of the clock track. A logical circuit 110 is constructed of a NOR gate 111, NAND gate 112, and AND gate 112. The photosensors E and F are connected to the NOR gate 111, whereas the photosensors G and H are connected to the NAND gate 112. Thus, the states in which the photosensors E and F face a bar, and the photosensors G and H face a space are detected. Only in this case, a signal "H" is outputted from the AND gate 113. Therefore, the data code can be read synchronously with the clock bar of the DX bar code. In order to allow the bar sensor units 8 and 9 to read irrespective of the photographic film 2 direction, a logical circuit 114 also is connected to the photosensor array 14B. The outputs from the logical circuits 110 and 114 are supplied to an OR gate 115. Upon outputting an "H" signal from the OR gate 115 signals from the photosensor arrays 13A and 14A are sampled at sampling circuits 116 and 117. The sampled signals are binarized at binarization circuits 118 and 119 each having comparators for the respective photosensors A to D. The binary signals are taken in the buffer memory to generate thereafter the bar code data in the manner described previously.

The present invention is applicable not only to a photographic printer, but also to a frame image inspection apparatus for manually determining an exposure correction amount. It will, of course, be understood that various changes and modifications may be made without departing from the scope of the present invention, which as generally stated, consists in the matter set forth in the accompanying claims.

We claim:

1. In a photographic apparatus comprising a film carrier for holding a photographic film and a film feeding mechanism for feeding said photographic film in a film feeding direction, an apparatus for reading a DX bar code recorded along one major edge of said photographic film and a frame number bar code recorded along the other major edge, the DX bar code comprising a clock track and a data track, the frame number bar code comprising bars and spaces, and being represented by binary signals "1" and "0" which values are determined correspondence to the width of the bars and spaces, wherein a narrower bar or space of said frame number bar code has the same width as that of each bar of said DX bar code, and a wider bar or space of said frame number bar code has a width two times as large as that of each bar of said DX bar code, the apparatus comprising:

two bar code sensor units mounted at opposite sides of a path through which said photographic film passes, both of said bar code sensor units having the same construction, each said bar code sensor unit including first and second photosensor arrays, said first and second photosensor arrays being located along said path at positions corresponding to said clock track and said data track, respectively, along a line perpendicular to said film feeding direction wherein said each said photosensor array comprises four photosensors disposed at a constant pitch along said direction of movement of said photographic film, said pitch allowing two of said four photosensors to face one bar of said DX bar code at the same time;

means for detecting whether said first photosensor array reads a bar of said clock track;

means for sampling an output from said second photosensor array synchronously with a reading of a bar by said first photosensor array; and means for generating said bar code data based on said sampled signal;

means for automatically discriminating between the DX bar code data and the frame number bar code data, based on two types of said bar code data read out with said two bar code sensors, and obtaining a film type from said discriminated DX bar code data and a frame number from said frame number bar code data; and means for judging a position of said photographic film in said film carrier based on said read-out two types of said bar code data, and means for outputting an alarm in response to an abnormal position of said photographic film in said film carrier.

2. An apparatus according to claim 1, wherein said means for judging positioning includes means for judging which two major surfaces of said photographic film is placed on said film carrier and whether said film feeding direction is a direction of increasing frame numbers.

3. An apparatus according to claim 2, further comprising means for designating said film feeding direction of said photographic film.

4. An apparatus according to claim 1, further comprising:
   means for measuring a feed amount of the read-out frame number bar code, from a reference position which is the mounting position of said bar code sensor unit;
   means for obtaining a distance to the center of a film a mask from one of the read-out frame number bar code and a printed frame number associated therewith, based on said measured feed amount; and
   means for obtaining a number of frames by dividing said distance by a spacing between one of said frame number bar code and said associated printed frame number, and calculating the frame number of a frame which is set at said film mask, based on said number of frames and said read-out frame number bar code.

5. An apparatus according to claim 4, wherein said feed amount measuring means comprises:
   a perforation sensor for detecting a perforation of said photographic film;
   a first counter for counting an output signal from said perforation sensor; and
   a second counter for counting a number of drive pulses used in feeding said photographic film, said second counter being reset synchronously with each count operation by said first counter, whereby said feed amount of said read-out frame number bar code is measured based on the number of perforations and the number of drive pulses.

6. In a photographic apparatus comprising a film carrier for holding a photographic film and a film feeding mechanism for feeding said photographic film in a film feeding direction, an apparatus for reading a DX bar code recorded along one major edge of said photographic film and a frame number bar code recorded along the other major edge, the DX bar code comprising a clock track and a data track, the frame number bar code comprising bars and spaces, and being represented by binary signals "1" and "0" which values are determined in correspondence to the width of the bars and spaces, wherein a narrower bar o space of said frame number bar code has the same width as that of each ar of said DX bar code, and a wider bar or space of said frame number bar code has a width two times as large as that of each bar of said DX bar code, the apparatus comprising:
   two bar code sensor units mounted at opposite sides of a path through which said photographic film passes, both of said bar code sensor units having the same construction, each said bar code sensor unit including first and second photosensor arrays, said first and second photosensor arrays being located along said path at positions corresponding to said clock track and said data track, respectively, along a line perpendicular to said film feeding direction wherein each said photosensor array comprises four photosensors disposed at a constant pitch said direction of movement of said photographic film, said pitch allowing two of said four photosensors to face one bar of said DX bar code at the same time;
   a plurality of differential amplifiers for generating a difference signal between the output signals from two adjacent photosensors of said photosensor array;
   a plurality of window comparators each generating a first signal of high level "H" when the output signal from each said differential amplifier is higher than a first reference voltage, and a second signal of low level "L" when the output signal from said differential amplifier is lower than a second reference voltage which is lower than said first reference voltage;
   means for generating said bar code data by sampling said first and second signals from said window comparators when either of said first and second signals from said window comparators changes;
   means for automatically discriminating between the DX bar code data and the frame number bar code data, based on two types of said bar code data read out with said two bar code sensors, and obtaining a film type from said discriminated DX bar code data and a frame number from said frame number bar code data; and
   means for judging a position of said photographic film in said film carrier based on said read-out two types of said bar code data, and means for outputting an alarm in response to an abnormal position of said photographic film in said film carrier.

7. An apparatus according to claim 6, wherein said means for judging positioning includes means for judging which of two major surfaces of said photographic film is placed on said film carrier and whether said film feeding direction is a direction of increasing frame numbers.

8. An apparatus according to claim 7, further comprising means for designating said film feeding direction of said photographic film.

9. An apparatus according to claim 6, further comprising:
   means for measuring a feed amount of the read-out frame number bar code, from a reference position which is the mounting position of said bar code sensor unit;
   means for obtaining a distance to the center of a film mask from one of the read-out frame number bar code and a printed frame number associated therewith, based on said measured feed amount; and
   means for obtaining a number of frames by dividing said distance by a spacing between one of said frame number bar code and said associated printed frame number, and calculating the frame number of a frame which is set at said film mask, based on said number of frames and said read-out frame number bar code.

10. An apparatus according to claim 9, wherein said feed amount measuring means comprises:
   a perforation sensor for detecting a perforation of said photographic film;
   a first counter for counting an output signal from said perforation sensor; and
   a second counter for counting a number of drive pulses used in feeding said photographic film, said second counter being reset synchronously with each count operation by said first counter, whereby said feed amount of said read-out frame number bar code is measured based on the number of perforations and the number of drive pulses.

* * * * *